United States Patent [19]

Khan et al.

[11] 4,179,732
[45] Dec. 18, 1979

[54] MICROPROGRAMMABLE PROCESSOR CONTROL PRINTER SYSTEM

[75] Inventors: Sultan W. Khan, West Lake; John K. Ham, Simi; Richard A. Strissel, Simi Valley, all of Calif.

[73] Assignee: DataProducts Corporation, Woodland Hills, Calif.

[21] Appl. No.: 805,527

[22] Filed: Jun. 10, 1977

[51] Int. Cl.[2] ............................................. G06F 3/12
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,651,487 | 3/1972 | Washington | 364/200 |
| 3,747,071 | 7/1973 | Haynes | 364/200 |
| 3,949,375 | 4/1976 | Ciario | 364/200 |
| 4,025,903 | 5/1977 | Kaufman et al. | 364/200 |

*Primary Examiner*—Harvey E. Springborn

[57] ABSTRACT

A self-diagnostic printer system divides tasks of the printer system into separate modules using a plurality of buses on a mother board. A central processing unit module performs the required operations in the system. An interface module interfaces the central processing module with a digital system user, a tape input, and an operator through a control panel. A timing and status module monitors a plurality of printer device fault conditions, generates a plurality of enable signals and drive signals and interfaces timing signals from a printer to the central processor unit. A power module generates driving currents for a clamping solenoid and a stepper motor so as to move the paper through the printer. A hammer driver module selectively fires hammer driver circuits to generate hard copy printout of digital information. An internal vertical format unit in which paper instructions are stored and selectively retrieved is used to direct the operation of the other modules according to a selected format. A detailed error, status and diagnostic scheme may be selectively executed at any point within the printer operation during any of the printer system's modes of operation, to provide visual output to the operator indicating an error or a status, and the nature and location of the error or type of status which has occurred so that any error within data or printer operation can be instantly analyzed and isolated to permit convenient rectification.

19 Claims, 28 Drawing Figures

18 POWER MODULE

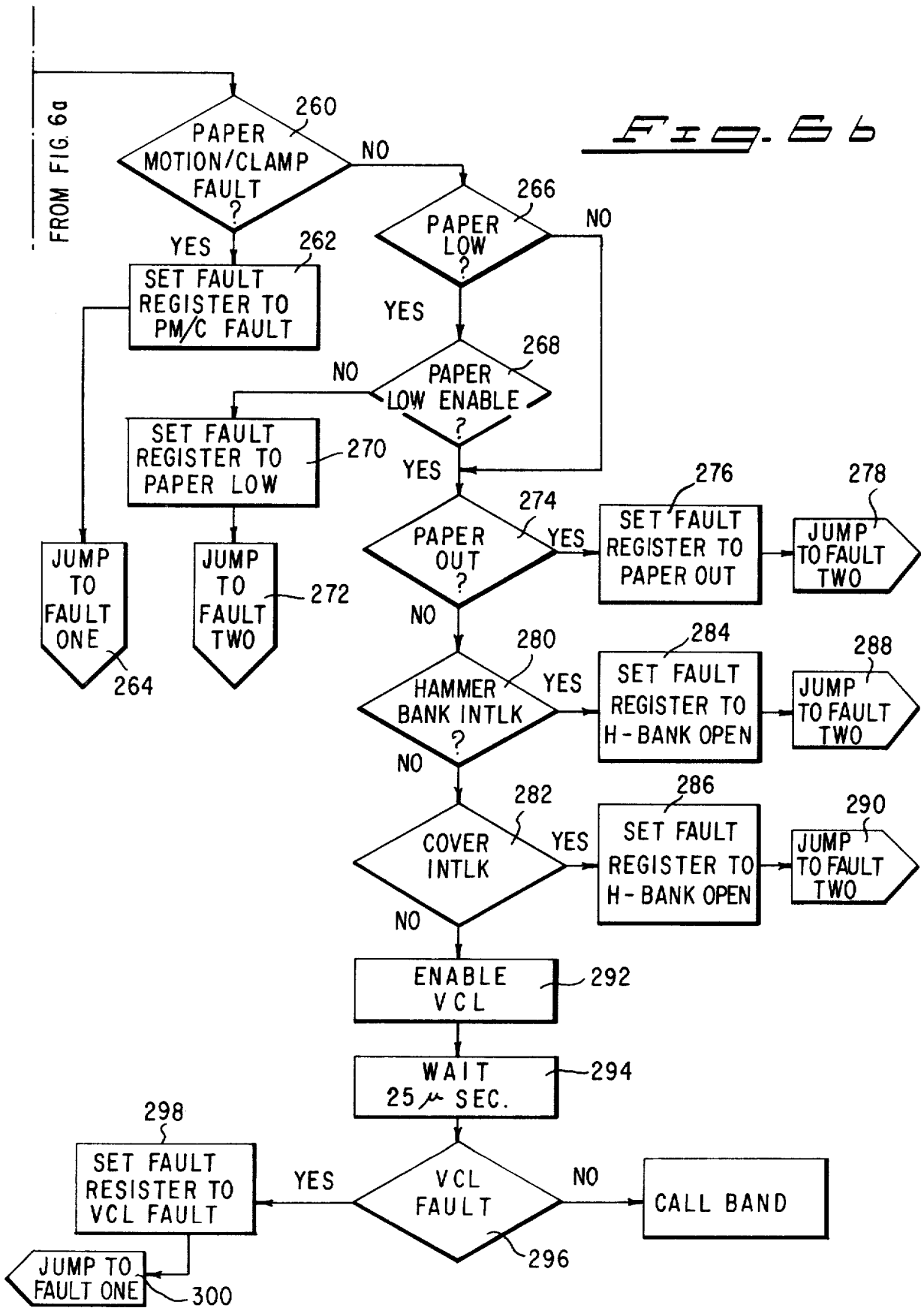

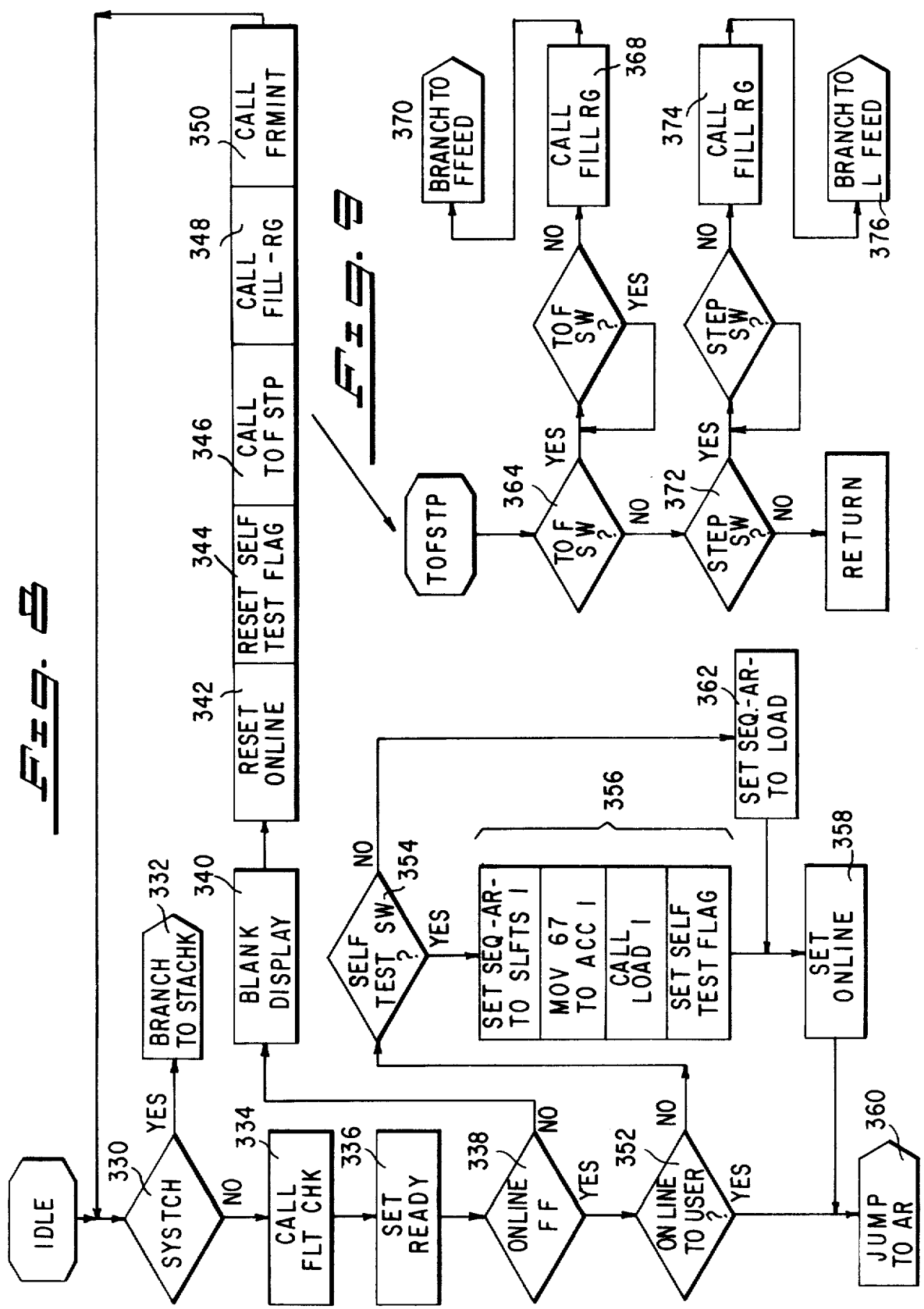

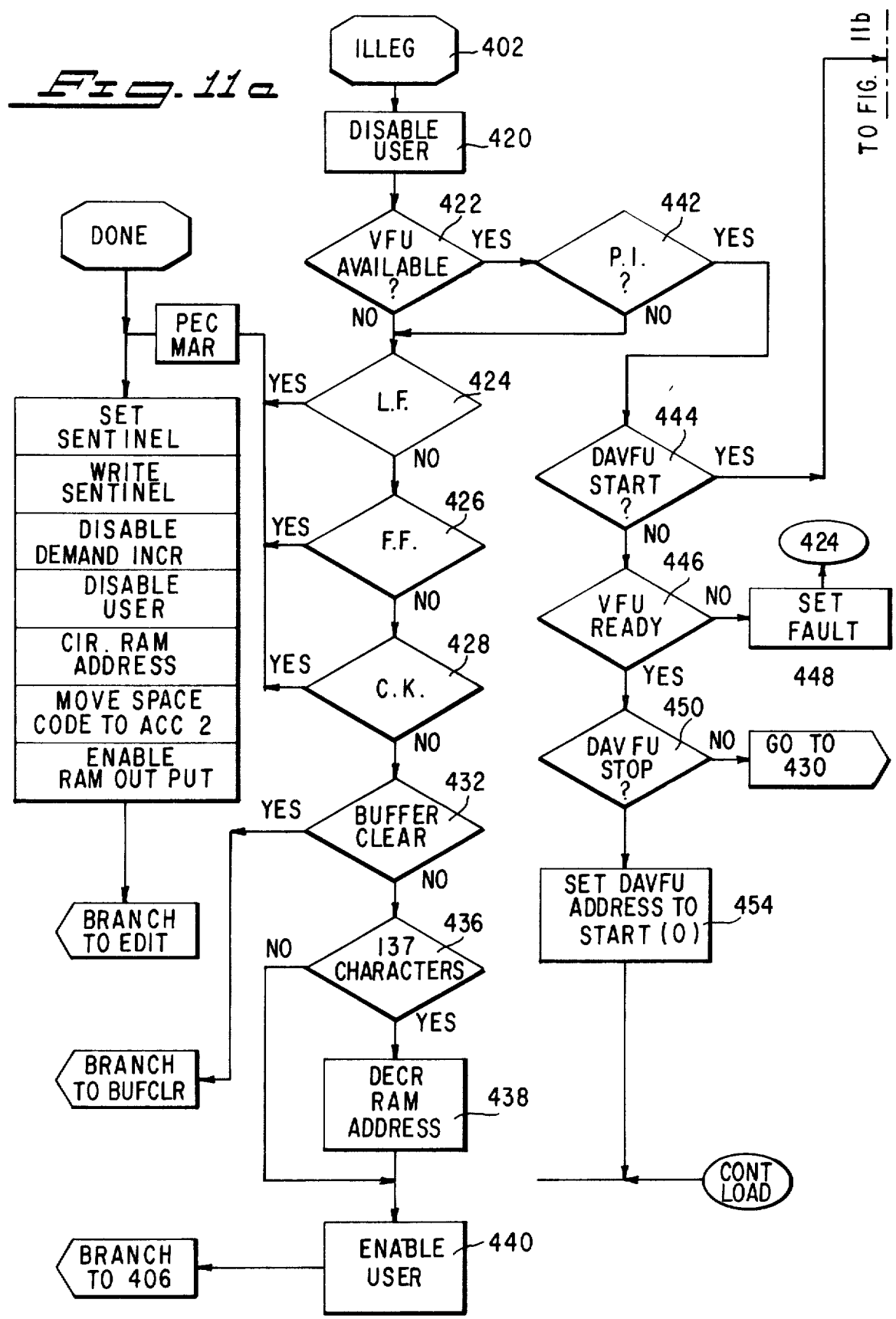

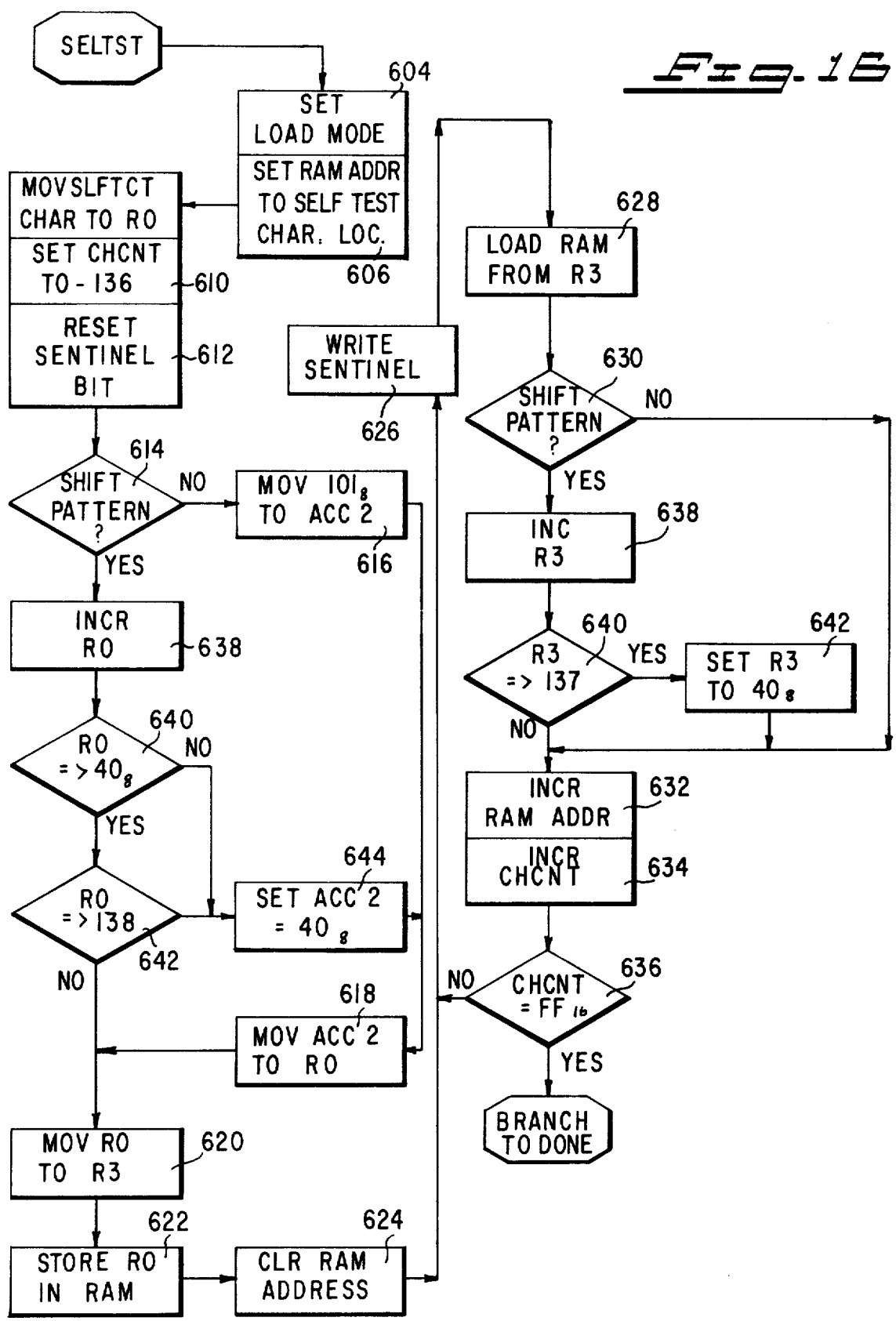

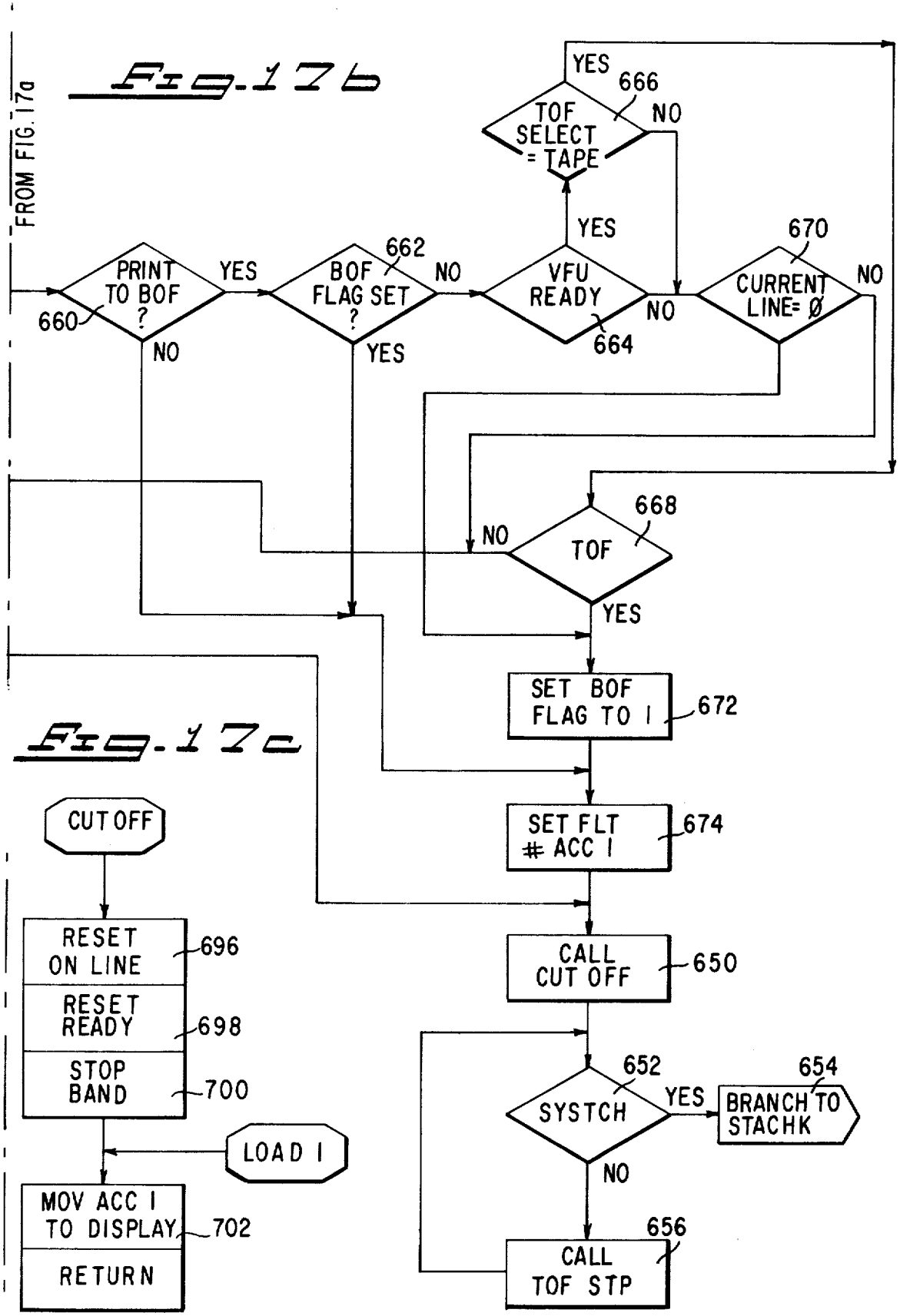

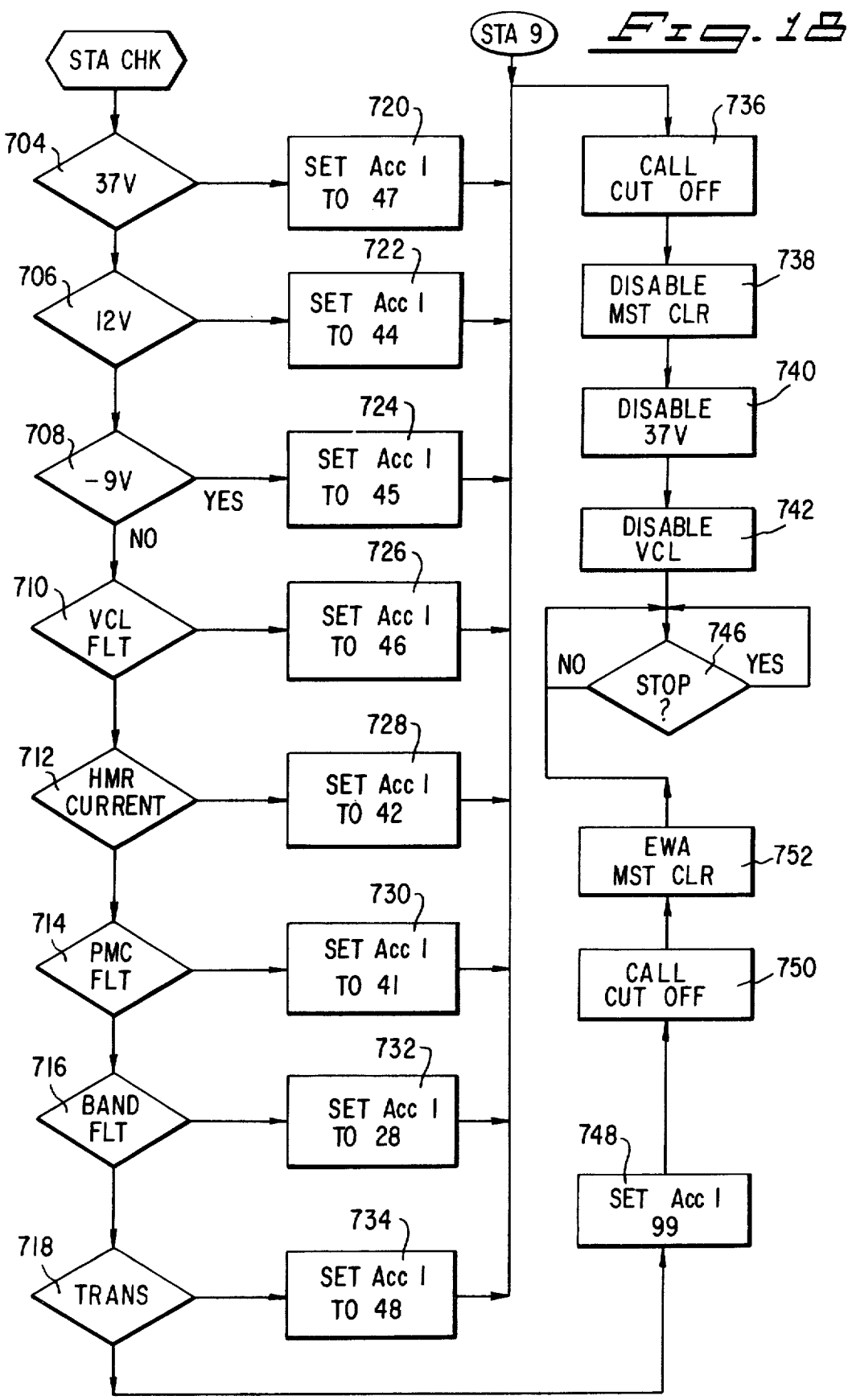

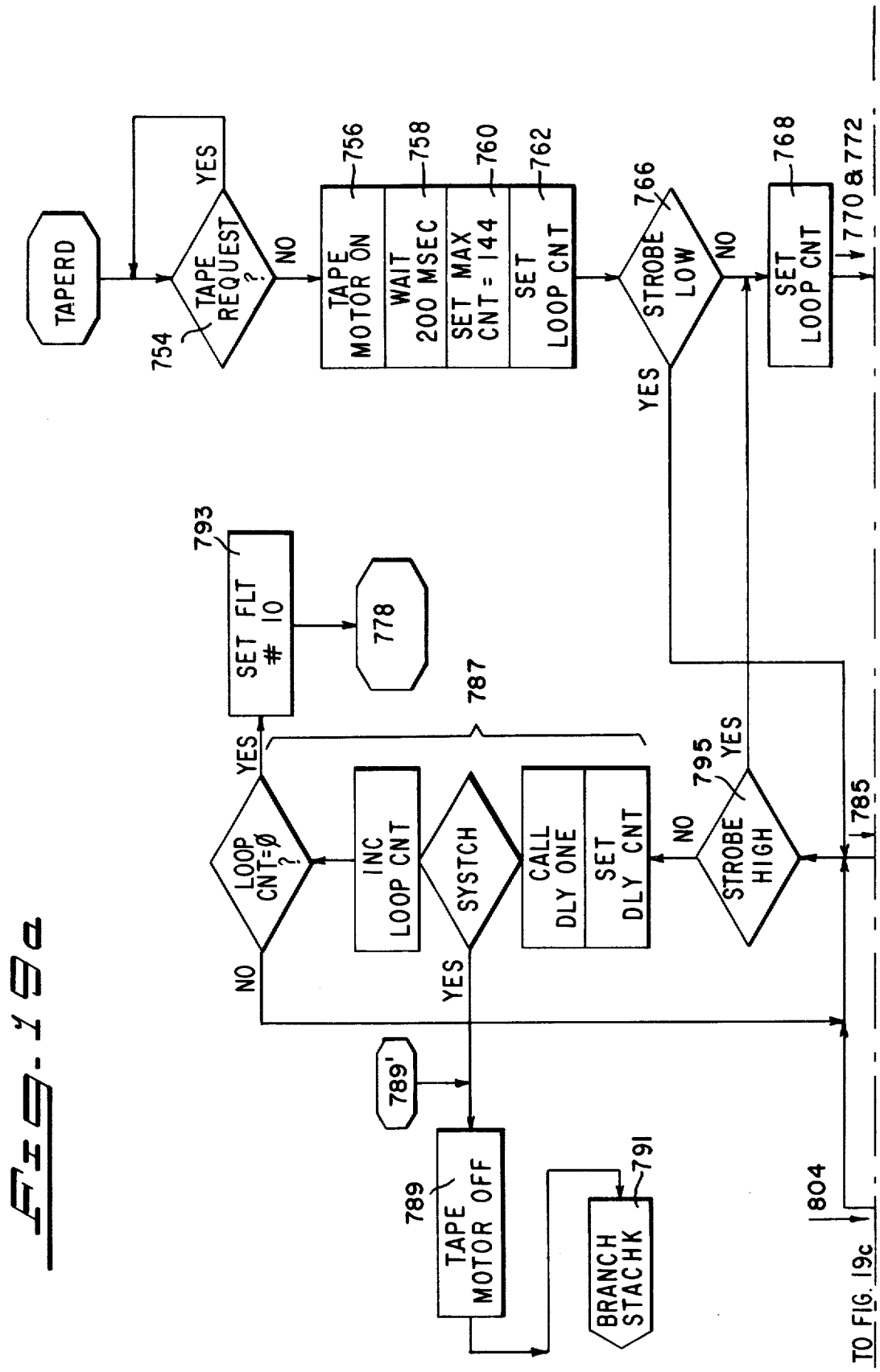

MICROPROGRAMMABLE PROCESSOR CONTROL PRINTER SYSTEM

BACKGROUND OF THE INVENTION

1. Field of the Invention

The present invention relates to the field of printers designed to produce a hard copy printout when operated on line or in association with a digital data system wherein the printer includes a self-diagnostic control means to accept the digital data, synchronize the production of the corresponding hard copy printout, provide programmed paper feed, and to perform internal, self-diagnostic functions to monitor, analyze and communicate status changes and fault conditions.

2. Description of the Prior Art

Prior art printers, designed to produce hard copy in cooperation with digital data systems, have previously used MSI ROM controlled logic to perform housekeeping functions regarding the acceptance and transference of data from the digital data system to the hard copy printer. In such prior art ROM controlled printers, diagnosis and analysis schemes have been rudimentary and communication of the status or fault to the user, system or operator has been limited and nonspecific. Typically, the control logic of the printer is circuitry which is capable of operating in a distinct number of phases or modes to perform the minimal number of data acceptance and transfer functions. For example, a load mode to receive and store print characters and paper motion characters; a justification mode to left justify data and line buffers; an illegality mode to check for the presence of illegal characters; a print mode to print the contents of line buffers; and a format mode to start execution of the paper motion character. Thus, the logic was highly specialized and limited to the necessary functions to transform digital data into hard copy printout. A typical prior art dedicated logic printer system is disclosed in the U.S. Pat. No. 3,651,487 to Washington. If an option is to be added, logic redesign is typically required. Furthermore, the logic circuitry designed to check for error analysis and status diagnosis is similarly specialized to the required and necessary tasks at hand. Therefore, status and fault diagnosis is limited by the architecture and capability of diagnostic circuitry. As a result, the number of diagnostic functions and the ability of the printer to analyze, isolate and communicate a particular status or fault condition is limited to merely the necessary functions. Each of these disadvantages have been overcome by the present invention without entailing greater costs or increasing circuit complexity.

BRIEF SUMMARY OF THE INVENTION

The present invention is a printer controller for interrogating and controlling a printer mechanism comprising a plurality of buses for digital data, an interface circuit board, a timing and status circuit board, a printer circuit board, and a central processing circuit board. The central processing circuit board controls the flow of data from the data source, stores the data, and directs the flow of data to the printer mechanism, including the interface circuit board, timing and status circuit board and printer circuit board. The central processing circuit board also performs a plurality of diagnostics, fault and status functions to generate fault and status indicators to an operator. The printer circuit board receives digital data and in response to the central processing circuit board and timing and status circuit board generates hard copy printout corresponding to the digital data. The timing and status circuit board interfaces the central processing circuit board to the printer circuit board and provides timing and status control signals to the printer circuit board responsive to control signals from the central processing circuit board. The interface circuit board receives digital data from the data source and controls the transfer of data to and from the printer control in response to control signals from the central processing circuit board and user. The interface circuit board, timing and status means, printer means and central processing means are each coupled to at least one of the plurality of digital buses. The digital buses provide intercommunication between each of the circuit board and allow free interchangeability and design expansion. By reason of this combination of means in a digital bus system, the operation of the printer controller and mechanism can be programmably controlled, interrogated and diagnosed and a plurality of operational options may be included without necessitating system redesign.

BRIEF DESCRIPTION OF THE DRAWINGS

FIG. 8 is a flow diagram illustrating the IDLE mode of the present embodiment wherein the central processor is waiting to go on line.

FIG. 9 is a top of form/step subroutine utilized within the IDLE mode.

FIG. 16 is a flow diagram of the self-test subroutine used to generate an internal pattern of data for testing the performance of the printer system.

FIG. 18 is a flow diagram of a status check subroutine which interrogates the status of a number of operating points within the printer system to isolate and analyze their status.

DETAILED DESCRIPTION OF THE PREFERRED EMBODIMENTS

The present invention is programmable and self-diagnostic digital printer designed to produce a hard copy printout when operated on line with a digital data system or user system. In the embodiments illustrated, the printer is an impact line, band printer. In one embodiment, the printer uses double spanning hammers with the conversion capability of assuming a second embodiment using a compressed type band such that the hammers are triple spanning. The circuitry of the printer is divided among the plurality of separate boards having bus inputs and outputs. The bus inputs and outputs of each circuit board is coupled to a mother board having a corresponding plurality of buses. Thus, each of the circuit boards are interchangeable and may be inserted into the mother board in any order. As a result, maintenance and design is dramatically simplified thereby reducing costs and maintenance down time. Each board performs a selected category of functions which are organized in a modular concept. As a result, additional boards may be added to add additional options without entailing circuit redesign or substantial retrofitting effort. By use of the modular and bus organization centered around a central processing unit, the digital printer becomes an intelligent system capable of sampling, interrogating, analyzing and diagnosing the condition and flow of data from the system user to the hard print copy. As a result of the inherent flexibility of a central processing unit, sophisticated printer operations may be executed with ease and simplicity and providing heretofore unachieved status and error diagnostics both as to the processed data and the printer itself. These and other advantages are best understood by viewing the overall system architecture as diagrammatic depicted in FIG. 1.

Figure 1:
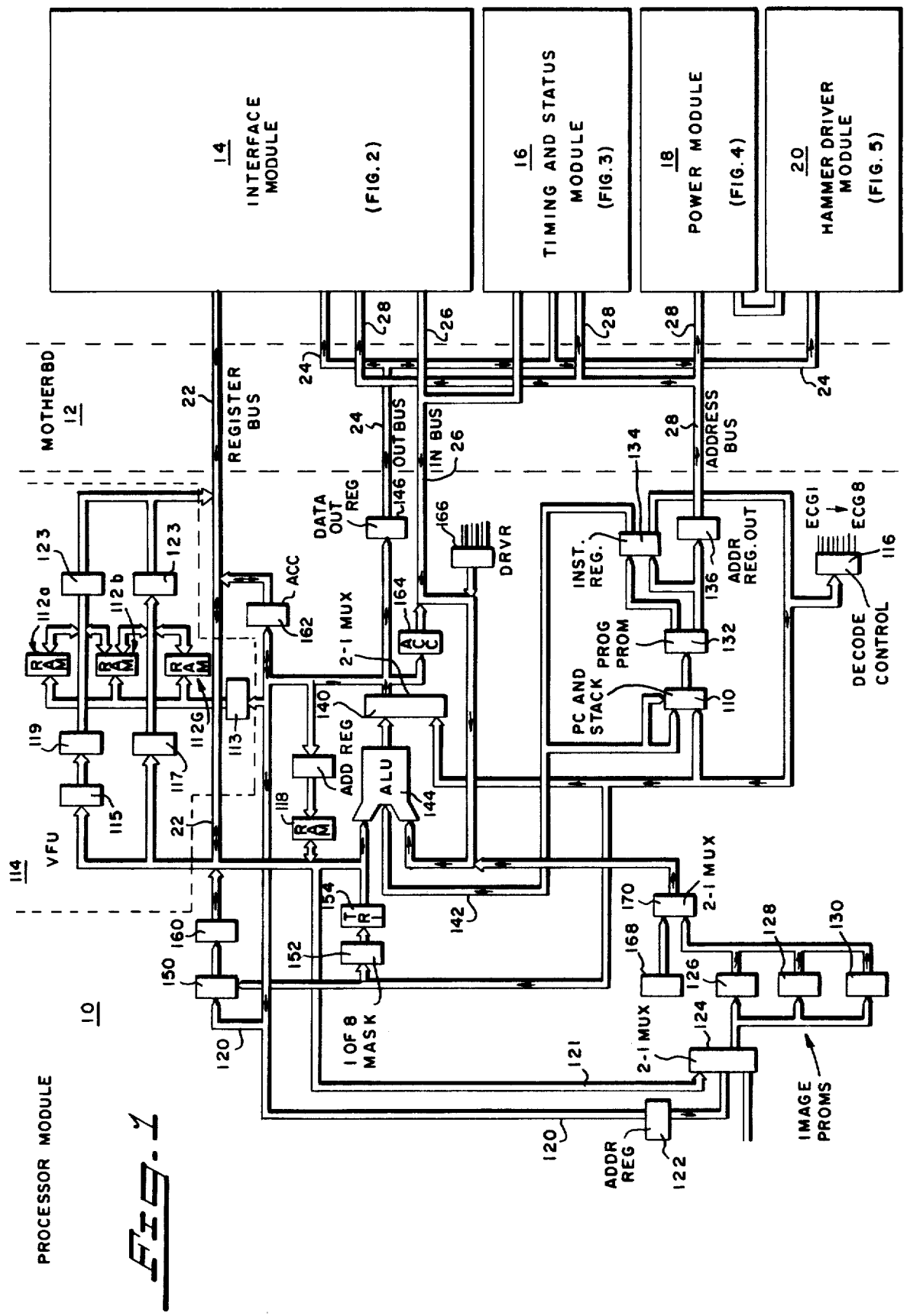
FIG. 1 is a simplified schematic of the overall printer system showing the central processor module in detail and the major bus lines as they are coupled to the peripheral module.

FIG. 1 illustrates one embodiment of the present invention wherein the circuitry of the printer has been divided into a processor module 10, mother board 12, interface module 14, timing and status module 16, power module 18 and hammer driver module 20. As shown, mother board 12 is characterized by four buses, register bus 22, out bus 24, in bus 26 and address bus 28. FIG. 1 illustrates the principal buses only, and it should be understood, as described below, that many other discrete control lines may be provided on mother board 12 to connect processor module 10 to its peripheral modules and vice versa.

Figure 2:
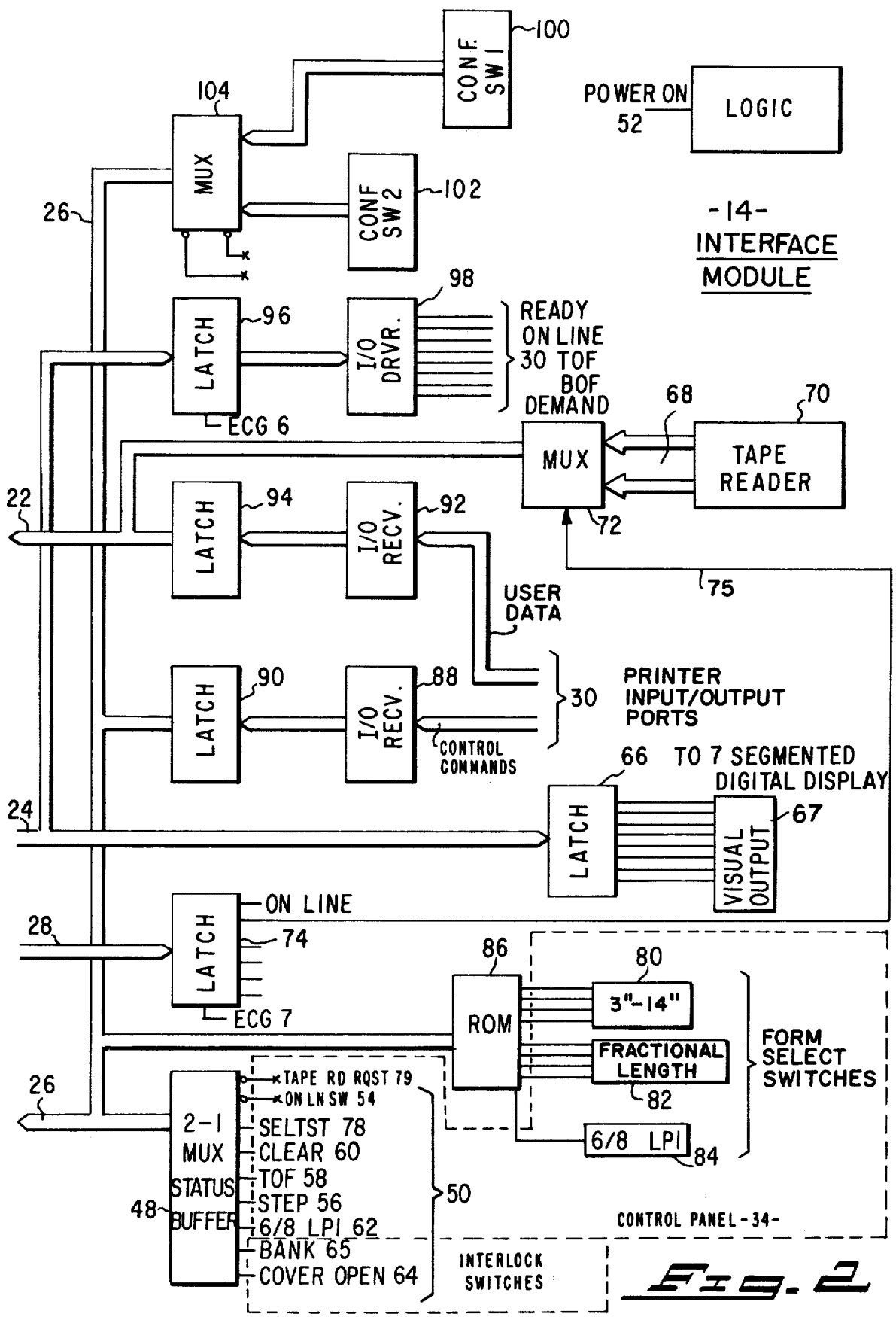
FIG. 2 is a simplified schematic of the interface module showing the major bus lines and circuit blocks within the interface module.

Consider first, interface module 14 of FIG. 2. The circuitry of interface module 14 interfaces the circuitry of the processor module 10 to the input/output 30 of the printer system, to vertical format unit 114 (VFU) via the register bus 22, to a control panel 34 and to various interlocks 64, 65 of the printer system provided as inputs to buffer and multiplexer 48, to form length select switches 80, 82 and 84, and visual digital display 67. Interface module 14 acts as a buffer and performs a plurality of logical functions subject to the control of processor module 10, which functions are necessary and essential to the operation and overall performance of the printer system. Such logical functions which are performed in whole or in part by interface module 14 include but are not limited to: (1) definition for processor module 10 of the configuration of the printer system options available to the user system; (2) the transfer of data to the printer system from the user under program control of processor module 10; (3) denounce of all interlock signals coupled to processor module 10; (4) the monitoring of the status of control panel 34, VFU 114 and the various interlocks by sending out a bit level status indicator under program a control to control panel 34, VFU 32 and the user system; (5) buffering and latching status or fault condition information for a digital display on the visual display 67 of the control panel 34; (6) buffering and multiplexing in a MUX 72 from a tape reader 70 to enable processor module 10 to store all twelve bits of a twelve channel tape reader; and (7) translating the setting of the form length select switches 80, 82 and 84 into the number of lines to be printed per form by processor module 10.

Once data is presented to interface board 14, such as through input/outputs 30, the data is transferred to processor module 10. Processor module 10 acts as a central processing unit. The circuitry of process module 10 performs a plurality of logical functions which are necessary and essential to the operation and performance of the band printer. Among these functions are the: (1) control of flow of data from the user system into a data buffer 118 together with the detection of control commands and generation of command signals during the data load cycle; (2) the performance of a logical compare operation on the input data while stored in the line buffer and transference of the stored data on a byte by byte basis to hammer driver board 20 for production of a hard copy; (3) synchronization of control logic with the hammer trigger and hammer reset pulses generated by timing and status module 16; (4) decoding of the command signal into specific paper feed instructions and generation of internal command signals coupled to power module 18 to appropriately step the paper feed; (5) performance of a plurality of housekeeping and diagnostic functions, including monitoring of any status change arising from operator intervention or fault condition, analysis and isolation of the specific fault or status, and display to the operator through interface module 14; (6) control of the transfer rate of data from the input/output to the print device; and (7) initialization of the printer system to an appropriate state during start up or manual reset conditions.

The timing and status module 16 enables processor module 10 to monitor the status of the printer system. Furthermore, the timing and status module 16 couples the character timing pulses from the magnetic transducer pickup from the steel band of the printer system to processor module 10. Finally, timing and status module 16 performs a plurality of logical functions which are necessary and essential to operation and performance of the unit, including but not limited to: (1) identification of band timing marks, amplification and digitization of the timing marks to generate the appropriate clock (S clock) to control the firing of the print hammers; (2) provision for character phasing and copy compensation to fine adjust print quality; (3) appropriate column spacing control under the supervision of processor module 10 for a plurality of modes of the print operation; (4) monitoring and control of the band speed by comparative use of a clock within processor module 10 and the band timing clock in timing and status module 16; (5) monitoring of power supply voltages, transducer, band drive and paper feed status and responsively communicating any status change in these items to processor module 10; (6) monitoring of temperature and minimum voltage; (7) generation of power up and power down reset sequences for the printer system; (8) monitoring and definition of the hammer driver waveform for processor module 10 wherein processor module 10 may define the hammer fire condition; and (9) incorporation of a print inhibit switch to disable the hammer drivers. The functions of power module 18 and hammer driver module 20 will be discussed below. The various interrelationships of interface module 14, timing and status module 16, and processor module 10 will be better understood after review of the component parts of each module and their functions.

In the illustrated embodiment, interface module 14 is shown as having a tristated status buffer and multiplexer 48 with its output coupled to in-bus 26 on mother board 12 and a plurality of inputs 50 coupled to a control panel 34 of mechanical switches and a plurality of system interlock switches. The control panel 34 mechanical switches include e.g., the form select switches 80, 82, 84, the step switch 56, the top of form (TOF) switch 58, the clear switch 60 and others shown in FIG. 2. The system interlock switches include e.g., the cover open switch 64 and the bank latch switch 65 also shown in FIG. 2. The inputs to multiplexer 48 may include basic functional switches to allow on-line operator input and control of the printer system. For example, the control panel 34 would include a power-on switch 52 which would couple the printer system to line power. Immediately upon power initiation, processor module 10 will generate an internal command signal, system reset, SYSRES, which is coupled by appropriate control lines in a conventional manner to interface module 14 to clear all input buffers and reset adjustable latches to the "off" condition. An on-line switch 54 on the control panel 34 will permit the operator to manually set an "on-line signal" to the multiplexer and status buffer 48. Processor module 10, as described below, will then selectively sample the status byte of status buffer and multiplexer 48 pursuant to program control. The on-line switch 54 signal, ONLNSW, corresponds to a status byte which signifies to processor module 10 that the printer is to change state to an "off" or "on" line condition.

Inputs 50 may further include an additional momentary contact switch 56, STEP, which will generate a second distinguishable status byte which will be stored in status buffer and multiplexer 48 to be selectively sampled by a processor module 10. Step switch 56 will generate a step switch signal, STEPSW, which corresponds to a status byte signifying to processor module 10 to step paper one line if the processor is in an "off line" mode. A top of form switch 58 will provide a third distinguishable status byte to buffer and multiplexer 48 to be selectively sampled under program control by processor module 10. A top of form signal, TOFSW, generated by switch 58 will correspond to a status byte which will signal processor module 10 to step to the next top of form position if the printer system is in an "off line" mode. A clear switch 60 will allow the operator to manually generate a master clear signal, MSCLSW, which will be latched through multiplexer and buffer 48 and coupled to a master clear line on mother board 12 to serve as a master clear signal for the entire printer system. A "six/eight LPI" switch 62 will allow the operator to manually indicate to the printer system that a six or eight lines per inch hard copy printout is required.

Similarly, a subgroup of inputs 50 are coupled to system interlocks such as a hammer bank latch 65 or cover open switch 64. Whenever the throat or cover of the printer system is opened, the bank latch switch 65 or cover open switch 64 will be activated. Interface module 14 will accept distinguishable interlock signals which will be stored as status bytes in status buffer and multiplexer 48. Typically, the interlock signals may be debounced by coupling the interlock signal through a set/reset latch before coupling to status buffer and multiplexer 48. As described below, each of the interlock status bytes will be interpreted by a processor module 10, latched, and displayed in latch 66 and the visual output display 67 of interface module 14. Display latch 66 may include conventional D-type flip flops with a clear input, to drive a segmented digital readout, output display 67, in a conventional manner.

In the presently illustrated embodiment, especially in those embodiments having an optional vertical format unit 114, VFU, or otherwise requiring a tape reader, interface module 14 is provided with a plurality of inputs to a multiplexer 72 coupled to a conventional tape reader 70. The output of multiplexer 72 is then coupled to register bus 22 of mother board 12. The architecture, function and operation of the vertical format unit 114 will be discussed in greater detail below. Multiplexer 72 is required in order to permit the standard twelve-channel tape reader to be read in the eight bit bytes register bus 22. Multiplexer 72 is strobed by control signals generated by addressable latch 74 through a discrete strobe control line 75, which latch in turn has its input coupled to address bus 28 on mother board 12. One of inputs 50 to status buffer and multiplexer 48 includes a manual switch 79, tape read request, which will indicate by operator intervention that a tape controlled vertical format unit, TCVFU, operation is requested. The signal from the tape read request switch 79 may be debounced and buffered through a set/reset latch before being driven into the status buffer and multiplexer 48. The processor module 10 will then selectively sample the status of the tape read request signal according to program control. Similarly, inputs 50 will include a two position switch SELTST 78 with a null position between the two positions to generate a self-test signal (1) and (2). As discussed in greater detail below, when processor module 10 interrogates the status of the self-test signal from self-test switch 78, test data inserted into the printer system will either be accepted from the user system, or one of two patterns will be internally generated and processed as if it were user data. Typically, the two types of internally generated self-test data include a constant datum, such as a single alphanumeric character or pattern data, such as a full set of the alphanumeric digitally encoded characters.

The operator also has an input through form length select switches 80, 82 and 84. Switch 80 will permit the operator to designate any length of form from, for example, a three inch length form to a fourteen inch form. Similarly, switch 82 will allow fractional length to be added so as to permit, for example, a one quarter or half inch form length. Form length select switches 80 and 82 together with form length switch 84, which allows the operator to indicate whether six or eight lines per inch is to be specified, are each inputs to a read only memory 86. The address provided by switches 80, 82 and 84 access an appropriate word within ROM 86 which is then coupled to in-bus 26 on mother board 12. The data from ROM 86 is then communicated to the arithmetic logic unit within processor module 10 and subjected to an appropriate execution under program control to provide the appropriate commands for printer operation.

Data from the peripheral or user system as well as user controls are coupled through input/output ports 30. Input/output buffer 88 receives user control commands such as a nontristated paper instruction signal, PAPINST; a buffer clear signal, BUF CLR; and DATA STROBE to signify the presence of valid data on the user data line. The output of buffer 88 is coupled to the input of a tristated latch 90. The output of latch 90 is similarly coupled to in-bus 26 on mother board 12. Similarly, user data is coupled to the input of an input-/output buffer 92 and through a tristated latch 94 to register bus 22 on mother board 12. A tristated circuit is one capable of achieving both the true and false logic states as well as a third high impedance state. The term "tristate" is used throughout the specification in this sense. Each of the latches in interface module 14 may be clocked or strobed by an appropriate control signal generated on interface module 14 through latch 74 in response to a combination of signals from address bus 28 and addressable control signal ECG 7 from processor module 10, or by a direct discrete control signal from processor module 10.

Interface module 14 communicates with the user system through an addressable latch 96 having an input coupled to out bus 24 on mother board 12 and addressed by a control signal ECG 6, generated in processor module 10. The output of latch 96 is coupled to an input-/output driver 98 which selectively generates output signals to the user system, such as: READY, a nontristated signal to signify to the user that the printer system is ready to be put on line; ON LINE, a nontristated signal to signify to the user that the printer has been placed on line and is ready to accept data; TOF, a nontristated signal to signify to the user that the printer system is at the top of form position on the hard copy printout; BOF, a nontristated signal to signify to the user that printer is at the bottom of form position of the hard copy printout; PRMV, a nontristated signal to signify to the user that the printer system is in the paper-feed mode; and DEMAND, a nontristated output signal to signify to the user that the printer system is ready to accept data from the user.

In the illustrated embodiment, two configuration modes are also permitted by allowing the operator to manually activate configuration switch 100 or switch 102. Byte length signals generated by activation of switches 100 and 102 are multiplexed through a tristated multiplexer 104 which in turn has its output coupled to in-bus 26 on mother board 12. By using eight-bit dual-in-line packaged switches for the configuration switches 100 and 102, the operator may provide a variety of information to processor module 10. For example, configuration switch 100 can be sampled on a carriage return to skip no lines, three lines, four lines or six lines before printing the subsequent line or other special instructions such as disabling the printing mechanism at the bottom of the form, altering standard length or enabling other peripherals. Similarly, configuration switch 102 may be used to select one of the tape channels as the bottom of the form. It is also to be understood that interface module 14 may contain additional conventional logic circuitry 106 to process further input and output control signals to interface module 14. For example, a power failure sensed by logic circuitry 108 of timing and status module 16 will couple a signal to interface module 14 to generate an appropriate output display through display 66. Further, it is to be contemplated that parity error logic may be included within logic circuitry 106 to check the parity of incoming data and to flag to processor module 10 a fault condition when a parity error is detected.

Manual potentiometer controls may also be provided on the control panel, such as a copies potentiometer which will send a control signal, COPOT, to timing and status module 16 to control the current applied to the hammers in order to control penetration of impact and, a phasing potentiometer, similarly supplying a control signal, PHPOT, to timing and status module 16 to allow fine adjustments of the phasing relationship between the type band and print columns. These and other internal command signals may be communicated to and from interface module 14 to convey status information between interface module 14, processor module 10, the user system and other peripheral modules within the printer system according to engineering principles well known to the art.

The principal control, coordination and synchronization of the printer system is performed by processor module 10 according to the program flow diagrams of FIGS. 6 through 19. Processor module 10 responds to operator commands to set the printer system in a mode or status capable of responding to or performing the command operation. For example, when power on switch 52 is activated, processor module 10 will initialize the printer system, including itself, and generate the system reset signal, SYSRES, on mother board 12 to initialize all peripherals. The program counter within sequencer 110 will be reset, all interlocks will be interrogated, all status flags will be interrogated, and if the printer system is in an operable condition, the ready signal will be generated in interface module 14 in response to the direction of processor module 10 in an off-line state. After on-line switch 54 is manually activated by the operator, processor module 10 will set the printer system into an on-line condition thereby coupling the printer to the user system and generating the demand signal at outputs 30 of interface module 14. When step switch 56 is manually activated, the processor module 10 will detect a change in status and if the printer system is in an off-line mode, will qualify and interpret the desired function, and will generate step command signals to power module 18 to advance the hard copy printout by one or any desired number of lines. When the operator activates TOF switch 58, processor module 10 will selectively sample corresponding status change, and if the printer system is if off line, processor module 10 will generate the appropriate step command signals to power module 18 to step the hard copy printout until the next TOF position is detected. Upon activation of clear switch 60, processor module 10 will interrupt operation and will generate a master clear signal for the entire printer system. The initialize routine, described in greater detail below, will be entered and all fault indicators will be cleared and the printer system placed in an off-line and READY condition. Activation of six/eight LPI switch 62 will permit processor module 10 to sample the condition of switch 62 whenever in an off line mode and before proceeding to an on-line mode. When the printer system is on-line, processor module 10 will generate appropriate command pulses to power module 18 to step the hardcopy printout by eight or six lines per inch as indicated by switch 62. Activation of any of the interlocks, such as hammer bank latch or cover open switches 64 will create status changes which will be sampled by processor module 10 which will put the printer system in an off-line condition when one of the interlocks is active. Typically, after the interlock goes inactive, clear switch 60 must be activated to clear the fault indicator and to reinitialize the condition of the printer system. Finally, manual activation of the tape read REQUEST switch will generate a corresponding status change to be sampled by processor module 10 which will then perform a logical operation if it is the off-line mode to insure that VFU memory is available to tape reader 70. If VFU memory is available, processor module 10 will generate an appropriate control signal coupled through mother board 12 to interface module 14 to enable the start of the tape controlled VFU motor in tape reader 70. A strobe signal from tape reader 70 will then be monitored by process module 10 which will enable latch 74 on interface module 14 to permit the appropriate twelve channel data be multiplexed into a VFU random access memory (RAM) 112 discussed in greater detail below. If all the tape data has been properly inserted into VFU module 114, processor module 10 will disable tape reader 70 and terminate the tape read operation. If an error has been detected during the tape reader operation, a format-read fault will be generated by processor module 10 and appropriately communicated through interface module 14 by means of visual output display 66. Similarly, if VFU module 114 is not available for data input, processor module 10 will detect the status of VFU module 114 and will similarly communicate its status as an error signal through interface module 14 by means of visual output display 66.

The operation of processor module 10 will be described in greater detail below in connection with FIGS. 6 through 19 but its general modes of operation can be understood by the following. Processor module 10 controls the operation of input/output data transfer, data printing, paper motion and status/fault or diagnostic detection.

For example, during the input/output data transfer condition, after processor module 10 has been enabled by power on switch 52 and set into the on line state by on-line switch 54, it will generate internal command signals coupled through mother board 12 to interface module 14 through out-bus 24 in combination with internal command signal ECG 6 generated by a control decoder 116 to enable interface module 14 to generate the signal, DEMAND, to the user system. After the data strobe has been received from the user, signifying the presence of valid data on the eight bit data interface, processor module 10 will generate an internal control signal, data latch, which will permit the user data to be transferred through buffer 92 and tristated latch 94 onto register bus 22. The data is then loaded into the internal line buffer or RAM 118. If the data transferred is not a command byte, processor module 10 will enable the demand signal again thereby requesting an additional data byte from the user system. The data will continue to be transferred from the user system and cumulatively stored in line buffer 118 until a command byte is detected. In the present embodiment, processor module 10 is capable of storing a 136 byte record length. Therefore, all data bytes transferred in excess of 136 will be lost until a command code is received from the user. Upon receiving a command code, processor module 10 will terminate the data load or input/output data mode and advance to an edit and print mode discussed below. While the printer system is on line, processor module 10 is in a busy state and will not accept or recognize any operator intervention until completion of the operation except for master clear switch 60.

After the user data is stored within line buffer 118, processor module 10 will synchronize its timing with a hammer reset pulse generated by a conventional magnetic reluctance detector sensing the identification and character marks on the print band and generated by character clock control 184 within timing and status module 16. Each character of data will be presented on internal out bus 158 to a band address register 122. The contents of register 122 will be multiplexed through multiplexer 124 which is internally controlled by processor module 10. The data will be compared against a store record of the print band in a selected one of the image programmable read only memories (PROM) 126, 128 or 130. After the completion of eight comparisons, the corresponding data will be transferred from line buffer 118 by processor module 10 to hammer driver module 20. The same comparison for character legality is executed by processor module 10 during data loading on internal load bus 121. Upon detection of a hammer trigger pulse derived from the moving print band through logic circuitry 108 to timing and status module 16, processor 10 will generate a hammer fire pulse. The print operation will continue until one of the column types has been completely printed. For example, in the case of double spanning hammers, all the odd print columns will be printed first followed by printing of the even columns. The present embodiment is also capable of printing compressed type wherein, without operator intervention, by merely changing the print band, the hammers may be employed as triple spanning hammers to print an A, B and C column. Processor module 10 will generate an appropriate delay to allow the settling of all the print hammers and then will generate control codes to timing and status module 16 to switch the print operation to the next print type, such as an even cycle if an odd cycle was previously printed. Processor module 10 will then continue to compare operation until all the even column data has been similary printed. The print cycle will then be terminated and processor module 10 will advance to the paper feed mode.

A band position counter 168 is coupled to a band multiplexer 170 which in turn has its output coupled to ALU 144. Thus, under proper program control, address register 122 may be appropriately incremented so that the selected image PROM may be synchronously addressed to provide the internal compare data required during the print mode.

After all the data in line buffer 118 has been printed, processor module 10 will decode the store control code for the specific paper feed function specified by operator and user commands and perform all the logical and arithmetic operations to generate the proper control signals on address bus 28 to power module 18 to execute the specified paper feed command, as described in greater detail below.

One of the most powerful features of the present invention is the ability of the printer system to be employed in an intelligent status and fault detection mode. Whenever the printer system is in an off-line state, or whenever any malfunction or fault occurs such as insufficient paper, lack of paper, paper feed faults, hammer bank latch opening or cover opening, processor module 10 will selectively interrogate the plurality of status bytes, analyze the status which is indicated and transmit the proper status and fault code on out-bus 24 to visual output display 66 on interface module 14. Thus, when as in the present embodiment, a two digit display is employed in display output 66, one hundred distinguishable status and fault conditions may be monitored, analyzed and communicated to the operator.

Similarly, when the printer system is on-line, any malfunction such as a hammer fault, paper runaway, paper jam, or any system status faults, will be detected by processor module 10 as a status change. Processor module 10 will then terminate the function which it is performing and drive the printer system off-line. In the off-line condition, processor module 10 will interrogate the status bytes to identify and analyze the fault or status change and transmit the appropriate status or fault indicator to the operator through display 66.

The bus structure and internal architecture of processor module 10 is illustrated in FIG. 1. The heart of the system is a microprogram sequencer 110 such as Advanced Micro Devices sequencer AM2911. The output of sequencer 110 is coupled to a programmable PROM 132 which contains the firmware of processor module 10. The output of PROM 132 is coupled to an instruction register 134 and address register 136. Address register 136 provides the output for address bus 28. The output of instruction register 134 is provided by an internal instruction bus 138 to control decoder 116 to provide control signals to the addressable latches of each of the other modules and to the ALU multiplexer 140. A second internal instruction bus 142 from instruction register 134 feeds back selected bits to sequencer 110 and couples the program instruction to the arithmetic and logical units (ALU) 144.

ALU 144 performs all the arithmetic and logic operations required for processor module 10 and may be effected by a conventional integrated circuit ALU such as Texas Instrument SN 74S181. The output of ALU 144 is multiplexed through the tristated ALU multiplexer 140 to data output register 146. The output of register 146 is coupled to out-bus 24 and provides selected data through outputs 30 to the user system, to the operator through visual display 66, to D-type flip flops 148 described below in connection with timing and status module 16; and to provide the required hammer timing pulses and data to hammer driver module 20. Instruction bus 138 is similarly coupled to a plurality of general purpose registers 150 actively used during program control. Instruction bus 138 is also coupled through a selective masking circuit 152 and tristated latch 154 to ALU 144. The contents of line buffer 118 is accessed through line buffer address register 156 which in turn is coupled to ALU multiplexer by internal register bus 158. Internal out bus 158 merges with print bus 120 and is similarly coupled to the input of a first accumulator 162. Internal register bus 158 is similarly coupled to a second accumulator 164. Accumlator 162 may be coupled to register bus 22 which, as discussed above, is coupled to line buffer 118 and ALU 144. The output of accumulator 164 is coupled to the processor module portion of in-bus 26 which terminates in ALU 144. A tristated driver 166 may be coupled with ALU 144 through in-bus 26 and provides processor module 10 with the hammer timing and trigger signals generated in timing and status module 16 to permit synchronization of processor module 10 during the print mode.

Figure 3:
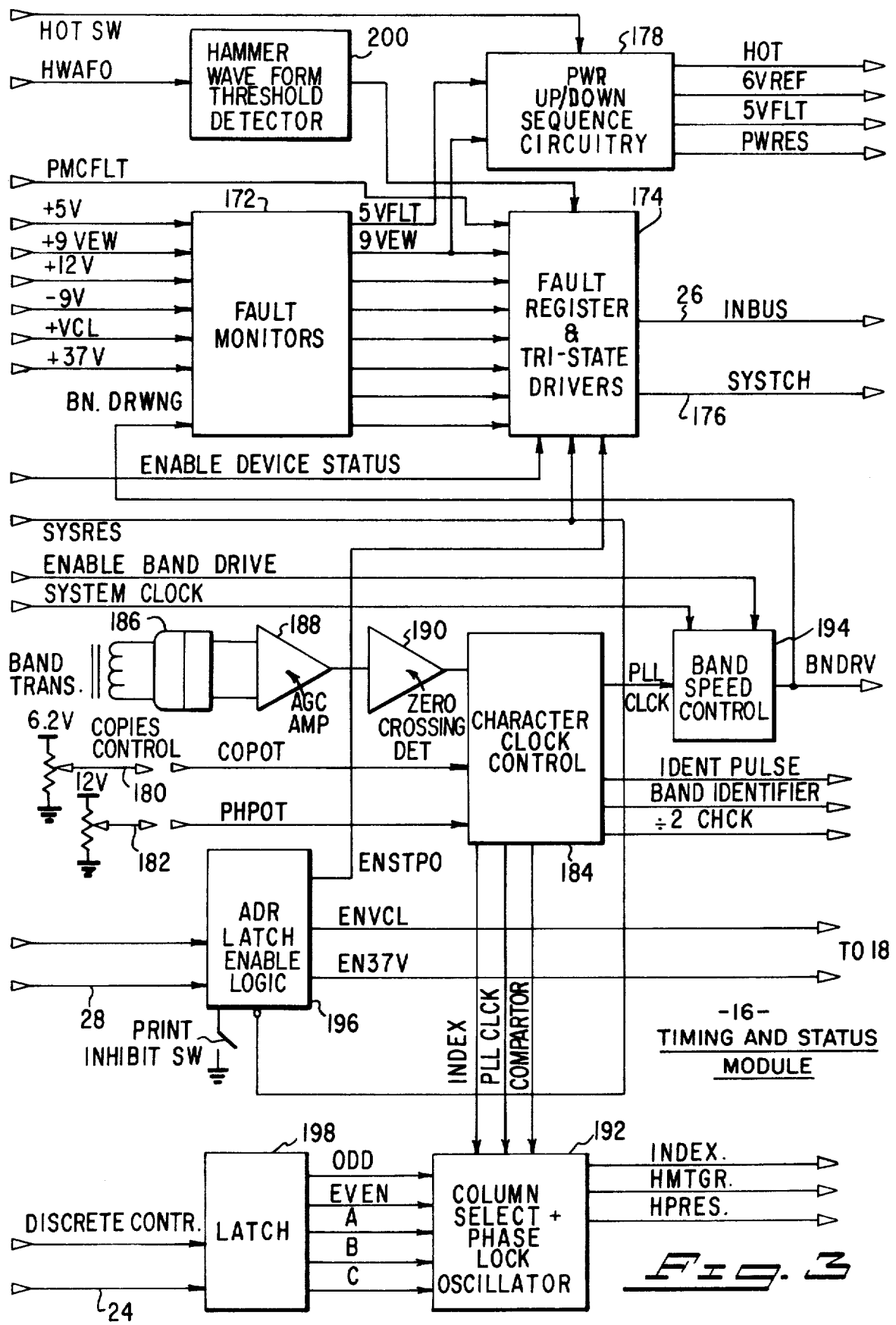
FIG. 3 is a simplified schematic of the timing and status module showing the printipal control lines, buses and major circuit blocks.

The operation and coordination of the various elements within processor module 10 and its peripherals involve timing and status module 16 which is responsive to a number of manually and internally controlled operations. For example, when power-on switch 52 is activated, a nine volt early warning signal, 9 VEW, the rectified but unfiltered output of the nine volted transformer in the master power supply of the printer system, is detected by fault monitor circuitry 172 which in turn generates an appropriate output signal coupled to fault register and tristate drivers 174 shown in FIG. 3. Register and drivers 174 provide the appropriate fault code on in-bus 26 and a systems status change flag, STSTCH, on line 176 coupled to processor module 10 to signify to the processor module that the change of condition in the printer system has occurred either by operator intervention or fault condition. Similarly, fault monitor 172 monitors a plurality of other voltages maintained throughout the printer system, including the hammer driver voltage, VCL, and the stepper motor and clamp voltage, 37 V. The activation of the nine volt early warning signal, 9 VEW, is coupled to power up/-down sequence circuitry 178 which will in turn generate as an output, a power reset signal, PWRES, to signify to processor module 10 and power module 18 that primary power is available. Similarly, when power on switch 52 is in the off condition, fault monitor 172 will detect the nine volt early warning signal and similarly indicate through the power reset signal, PWRES, from sequence circuitry 178 that the printer system is losing primary power.

A copies control, COPOT, and a phasing control signal, PHPOT, is drawn from a wiper on potentiometers 180 and and 182 respectively in timing and status module 16. COPOT and PHPOT are presented as inputs to a comparator within character clock control circuitry 184. The other side of the comparator within circuitry 184 is derived from a band transducer 186 to a gain controlled amplifier and zero crossing detector 188 and 190 respectively. As COPOT and PHPOT are varied, the voltage to the comparator similarly varies. As COPOT is varied, phase lock oscillator 192 will execute a variable phase delay to keep the phasing relationship between the print band and hammers constant as the hammer current is increased or decreased with the variation of CPOT as controlled by power module 18. A variable delay is required to compensate and cancel the unavoidable phase shift which occurs in the hammer current waveform when the magnitude of hammer current is varied. Another input to the comparator will also be coupled to the phasing control, PHPOT, while the other side of the comparator will be a single or analog combination of COPOT and the character pulse derived from zero crossing detector 190. As PHPOT varies, the output of the comparator is coupled to phase lock loop oscillator 192 to create a corresponding phase delay between the hammer firing position and print band. Thus, any misregistration or ghosting in a hard print copy can be corrected by manual operation of COPOT and PHPOT.

Character clock control 182 monitors and processes the character clock signal from the print band detected by transducer 186. The character clock signal is digitized and separated into various character clocks, i.e. an index clock signifying the beginning of the print band and a band identifier clock signifying which of a plurality of possible print bands has been loaded into the printer system. The band identifier clock and index clock are detected from the pulse train and coupled to processor module 10 to be used as data to permit selection and synchronization with the proper image PROMS 126, 128 and 130. In response to the index and character pulse clock, PLLCLK, phase lock loop oscillator 192 will generate hammer trigger, HMTGR, and hammer reset, HPRES, pulses which are accepted by processor module 10 to be used as synchronization references discussed above when the printer system is in the print mode. In addition, the character clock is used within timing and status module 16 in a servo/system to control band speed. The clock pulse is coupled from character clock control 184 to band speed control circuitry 194. A system clock, SYSCLK, derived from a crystal controlled master clock within processor module 10 is used to set or reset a band drive signal, BNDRV, coupled to the band drive motor on power module 18 as discussed below. In between two successive character clock pulses, band speed control circuitry 194 will enable a temporal window during which the number of system clock transistions is counted. If the next character clock transition does not come within a predetermined number of system clock transitions, the band drive signal will be set to indicate insufficient speed. If the character clock transition comes before the predetermined number of systems clock transitions, the band drive signal would be reset to indicate excessive speed. Thus, timing and status module 16 acts as a bang-bang servo to drive the band motor driver amplifier in power module 18.

Addressable latch 196 has its inputs coupled to address bus 28 and control group signal, ECG4, from processor module 10. The output of latch 196 generates hammer driver voltage enable signal, ENVCL, and the print motor and clamp enable signal, EN37V, which is coupled to the power module 18 to effect the desired operations with respect to the hammers, print motor and clamp.

Output data generated by processor module 10 is presented in out-bus 24 as the input to latch 198. The output data is decoded into a logic signal corresponding to the print type which the processor module directs at that time to be printed, that is "odd" and "even" in the case of a double spanning hammer, and "A", "B", and "C", in the case of a triple spanning hammer. These logic signals are inputs to phase lock circuit 192 where they are logically manipulated to produce the desired delayed pulse train to fire a given hammer with the proper timing with respect to the column positions.

In addition to voltage monitoring, fault register 174 has as its input the output of hammer waveform threshold detector which has as its input, an attenuated hammer driver voltage, and as its output, a logic fault signal whenever the hammer driver overheats causing the waveform to drop in voltage and force the hammer driver into thermal shut-down. Similarly, a paper motor and clamp fault signal, PMCFLT, is an additional input into fault register 174 and is generated on power module 18 to indicate that an overload condition has occured in the stepper motor or clamp driving circuitry.

Power module 18 interfaces processor module 10 to the paper feed drive system, interfaces timing and status module 16 to the band drive system and regulates the logic voltage source for the entire printer system. Acting as a peripheral to processor module 10, the power module 18 performs a number of analog and digital functions necessary to the operation of a performance of the printer system including: (1) supplying all DC regulated voltages to the printer system; (2) translating the band drive enable signal into a specific voltage level and current in order to run the print band; (3) monitoring all voltages and protecting for over voltages or over currents in the printer system; (4) protecting the printer system from over temperatures and flagging an over temperature error to the operator through interface module 14 by means of output display device 66; (5) controlling hammer driver current for penetration control (COPOT); (6) protecting hammers in case of fault; (7) translating the digital paper feed control signals from processor module 10 into analog voltage signals to run the paper feed system; (8) amplifying and controlling application of the voltage supply to the stepper motor and clamp solenoid; and (9) protecting the clamp circuitry and stepper circuitry against overcurrents and flagging errors to processor module 10 whenever such an overcurrent persists.

Figure 4:
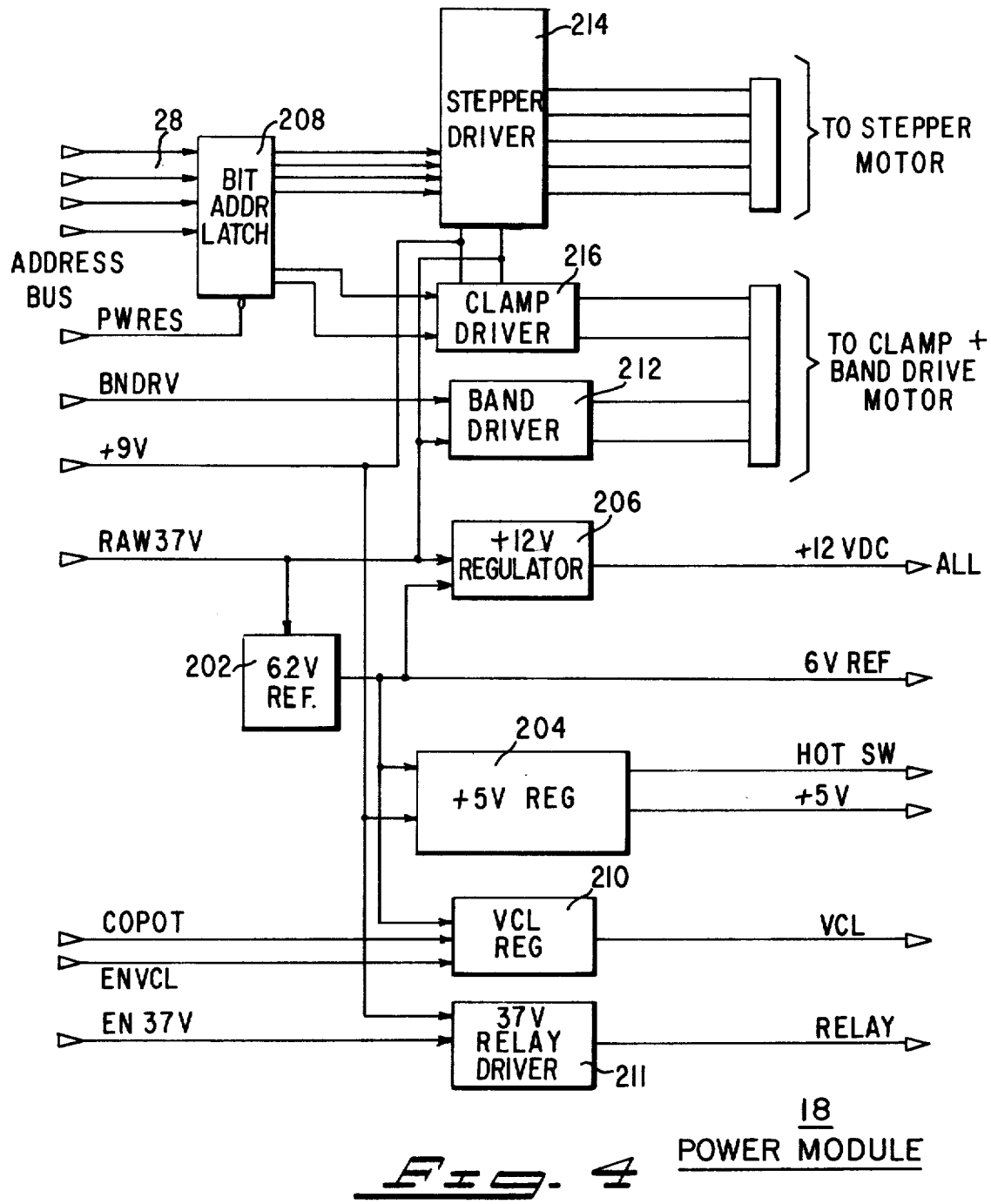
FIG. 4 is a simplified schematic showing the power module together with its input and output lines.

The components of power module 18 are best shown in FIG. 4. When power-on switch 52 is manually activated blind power will be supplied to power module 18 which will then generate the required regulated voltages from semiregulated bulk voltages RAW base 37 V (35 volts to 49 volts) and plus 9 V (8-12 volts). A five volt reference voltage will be generated from a 6.2 volt reference zener 202 for the five volt regulated supply 204 to supply the five volt power supply for all logic circuitry. A twelve volt regulated power supply 206 is also powered up to supply twelve volts where needed throughout the printer system, such as in amplifiers in both power module 18 and timing and status module 16. In addition, when power-on switch 52 is activated an internal power reset signal, PWRES, is generated in timing and status module 16. Power reset will be coupled to power module 18 to clear addressable phase latch 208. Latch 208 will have address bus 28 as its input and will provide the proper phasing signals to the stepper motor.

Power module 18 will also be provided with the control signal, COPOT, from status and timing module 16 which will be an input to hammer voltage regulator 210. THe voltage and hence the current supplied to the hammers will be correspondingly varied in proportion to COPOT and thus control the magnitude of impact energy between the hammers and hard copy printout.

Power module 18 may also include conventional band driver circuitry 212 which is responsive to the band enable signal, BNDRV, generated within timing and status module 16 to regulate the current to the band drive motor.

The output of decoder and latch 208 is coupled to the input of stepper drive circuitry 214 and to the input of clamp solenoid driver 216. The desired phased voltages are supplied to the stepper motor and solenoid clamp by drivers 214 and 216 pursuant to processor control through decoder latch 208.

Figure 5:
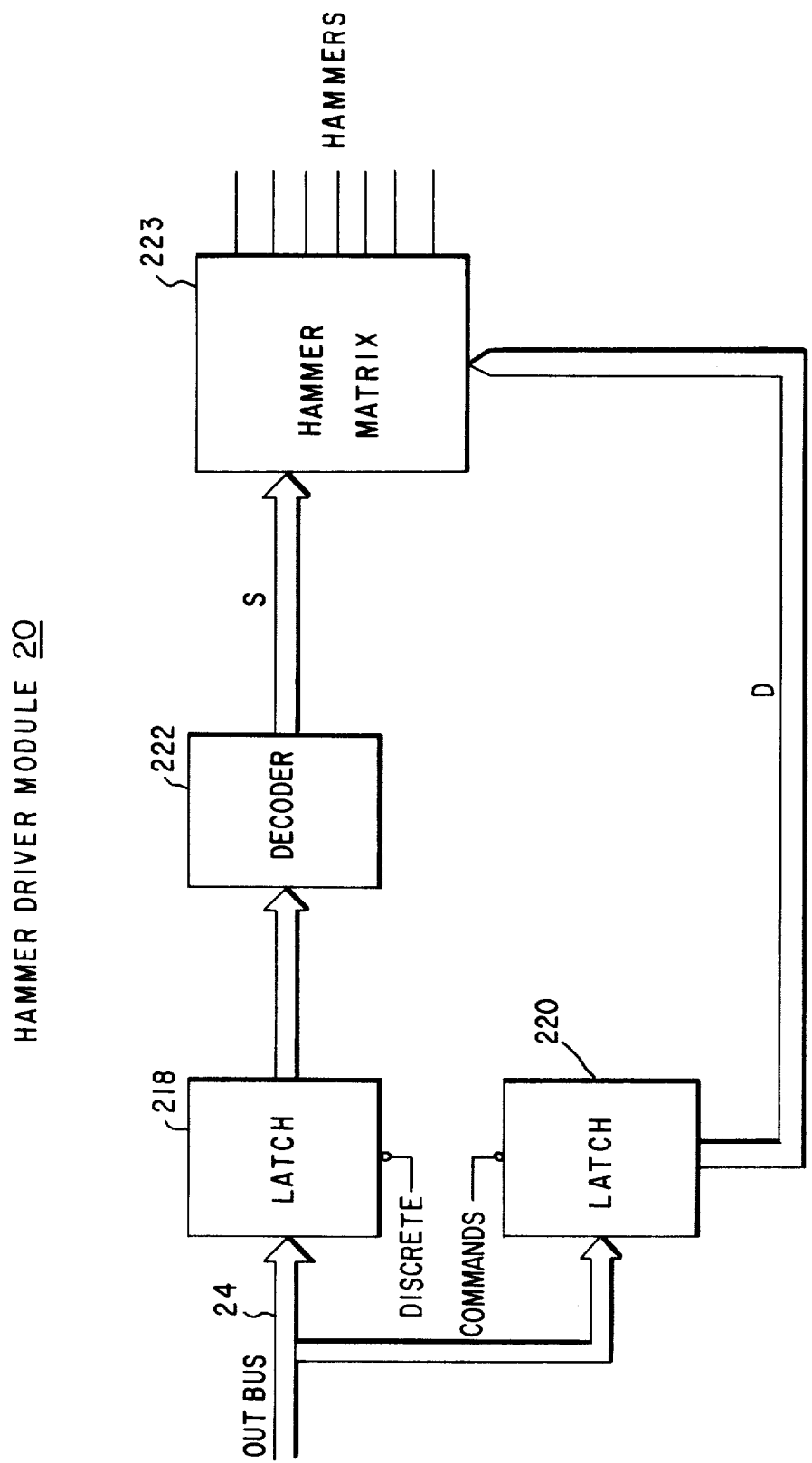
FIG. 5 is a simplified schematic showing the hammer driver module.

Finally, hammer driver module 20 (FIG. 5) is provided with parallel latches 218 and 220 having input coupled to out-bus 24 on mother board 12. Latch 218 loads an encoded word corresponding to the proper S hammer firing pulse, S0-S8 to be selected by a BCD to decimal decoder 222. Latch 220 generates an appropriate hammer data signal to select the chosen hammer in a conventional in hammer matrix driver circuit 224.

Vertical format module 114 is one of many options available in a printer system utilizing the present invention. VFU module 114 allows processor module 10, in conjunction with interface module 14 to load VFU data on register bus 22 either from tape reader 70 or from data inputs 30. VFU 114 also allows tape channel or skip commands be interpreted by processor module 10 as valid paper feed commands and permits processor module 10 to implement channel commands and skip commands through power module 18 to execute the appropriate paper feed drive functions. Top of form switch 58 on the control board within interface module 14 will generate a status change which will be selectively interrogated by processor module 10 when in the off-line mode. Processor module 10 will then interrogate a VFU flag to determine whether or not VFU memory is available. If the flag is set, the current channel position will be loaded into the VFU memory map through VFU address register 226. Process module 10 will then interrogate the rest of the VFU memory map through address register 226 until it locates the top of form position channel. Processor module 10 will then know how many lines it has interrogated to find the top of form position and will set a count through which it must slew or step in order to get to the next top of form. Processor module 10 will accordingly initiate pulses to the paper feed drive system through power module 18 stepping the specified number of lines. After each step processor module 10 will interrogate the VFU memory through VFU address register 226 for a channel comparison. If the channels do not compare, processor module 10 will continue to interrogate VFU memory to find its position with respect to the top of form position and will step accordingly. If the specified top of form channel cannot be found, processor module 10 will flag the operator to indicate a fault condition through visual output display 66 on interface module 14.

Upon receiving a specific paper instruction command, processor module 10 checks if the VFU memory is available and per then loads the VFU data from the user system or tape reader. Upon receipt of the command, processor module 10 will set up a starting address in the VFU memory map by initiating the address value of VFU address register 226. At the end of the transmsision, the user or tape reader will send a stop code to processor module 10 signifying the end of VFU data transfer. Processor module 10 will advance from loading the VFU memory map to a standard load data mode. Similarly, channel commands are executed in the VFU memory map in the same fashion as top of form commands with the exception that the channel command will originate from tape reader 70 or the user.

The coordination of the various elements shown in FIGS. 1 through 5 and their control by processor module 10 illustrating the flexibility and power that the present invention provides to a printer system, can now be appreciated by considering the operational flow diagrams depicted in FIGS. 6 through 19.

Figure 6A:
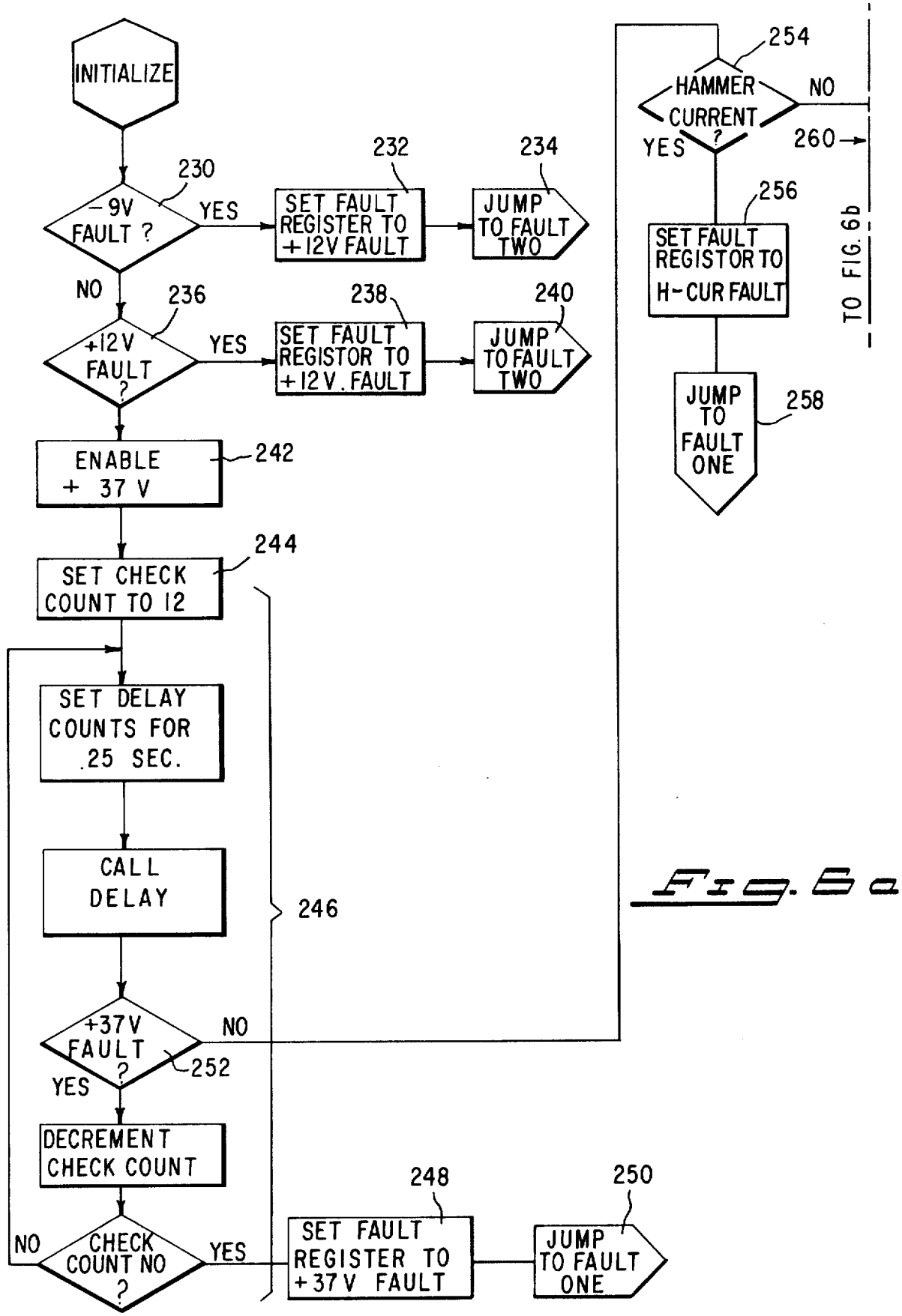
FIGS. 6a and b are flow diagrams illustrating the INITIALIZE mode of the illustrated embodiment of the present invention.

FIGS. 6a and b, diagrammatically outline the operation of the present invention during the initiation phase. After power on switch 52 has been manually activated and before on line switch 54 has been activated, processor module 10 begins initialization mode 228 by interrogating timing and status module 16. First, processor module 10 interrogates and samples the status byte corresponding to the signal, minus 9 V, which is the output of two rectifier diodes and the power assembly supply to indicate primary power. If there is a fault at 230, processor module 10 will set at 232 an internal fault register, such as accumulator 1, and jump at 234 to a selected fault subroutine. If there is no primary fault, processor module 10 will interrogate the status byte corresponding to the signal, plus 12 V, from timing and status module 16 to signify that a twelve volt regulated signal has powered up within the system, in particular, in power module 18 and timing and status module 16. If at 236 a fault is indicated, a fault flag will be set in an internal fault register at 238 followed by a jump to a selected fault subroutine 240. If there is no twelve volt fault, processor module 10 will enable 37 V relay driver 211 to close appropriate relay contacts in the hammer driver circuitry and to provide power to the band drive, paper drive and paper clamp. After the 37 V supply has been enabled at 242, a internal count is set at 244 and a delay loop 246 is executed to allow the slower rise time for the 37 V electromechanical circuitry. If, at the end of the delay, the circuitry has not come on line, a fault register is set at 248 with an appropriate jump to a selected fault subroutine at 250. If, during the delay, the 37 V circuitry is suitably enabled, processor module 10 at step 252 will exit delay loop 246 and interrogate the status of the hammer driver current at step 254 from hammer driver module 20. If there is an overcurrent, indicating a malfunction, an internal fault register is set within processor module 10 at step 256 with appropriate jump to a selected fault subroutine 258. If the hammer current is adequate, the paper motion and clamp current is checked at step 260. If there is an overcurrent, similarly, an internal fault register will be set at 262 with an appropriate jump to a selected fault routine at 264. If the current is appropriate, processor module 10 will then interrogate the status of the amount of paper loaded into the system at step 266 through the interlock signals provided through multiplexer and status buffer 48 of interface module 14. If a low paper supply is indicated, processor module 10 will interrogate a bottom of form status byte. If at 268 the bottom of form flag is activated by the user, when the paper supply is low, processor module 10 will set the appropriate fault register 270 and jump to a selected fault subroutine at 272. The bottom of form flag will signify to processor 10 that the user desires the balance of the form to be printed and then to disable the system instead of disabling the printer as soon as the paper is low. However, if the bottom of form flag has not been activated, or if the paper is not low, processor module 10 will then interrogate status buffer and multiplexer 48 to determine at step 274 if the printer system is out of paper. If so, an appropriate fault register will be set at step 276 with a jump 278 to a fault subroutine. If the paper is not out, then processor module 10 will interrogate status buffer 48 at the step 282 to determine whether or not the hammer bank interlock is open. If the response is negative, processor module will then interrogate status buffer 48 as step 282 to then determine whether or not the cover interlock is open. In any case, where a fault is indicated, an appropriate fault register will be set at either steps 284 or 286 with a selected jump to a subroutine at steps 288 or 290 respectively. If these interlocks are clear, processor module 10 will then generate, pursuant to program control, the enable VCL signal which will enable hammer driver voltage and current at 292, followed by an appropriate delay executed at 294 to permit a reasonable rise time to operating levels. If, at 296, the status byte corresponding to the hammer driver current within fault register and drivers 174 of timing and status module 16, indicates a malfunction, an appropriate fault register will be set at 298 with a selected jump to a fault routine at 300. If the initialization sequence has been successfully executed, processor module 10 will enter the next phase of operation in which the band printer driver will be started and brought up to speed.

Figure 7:
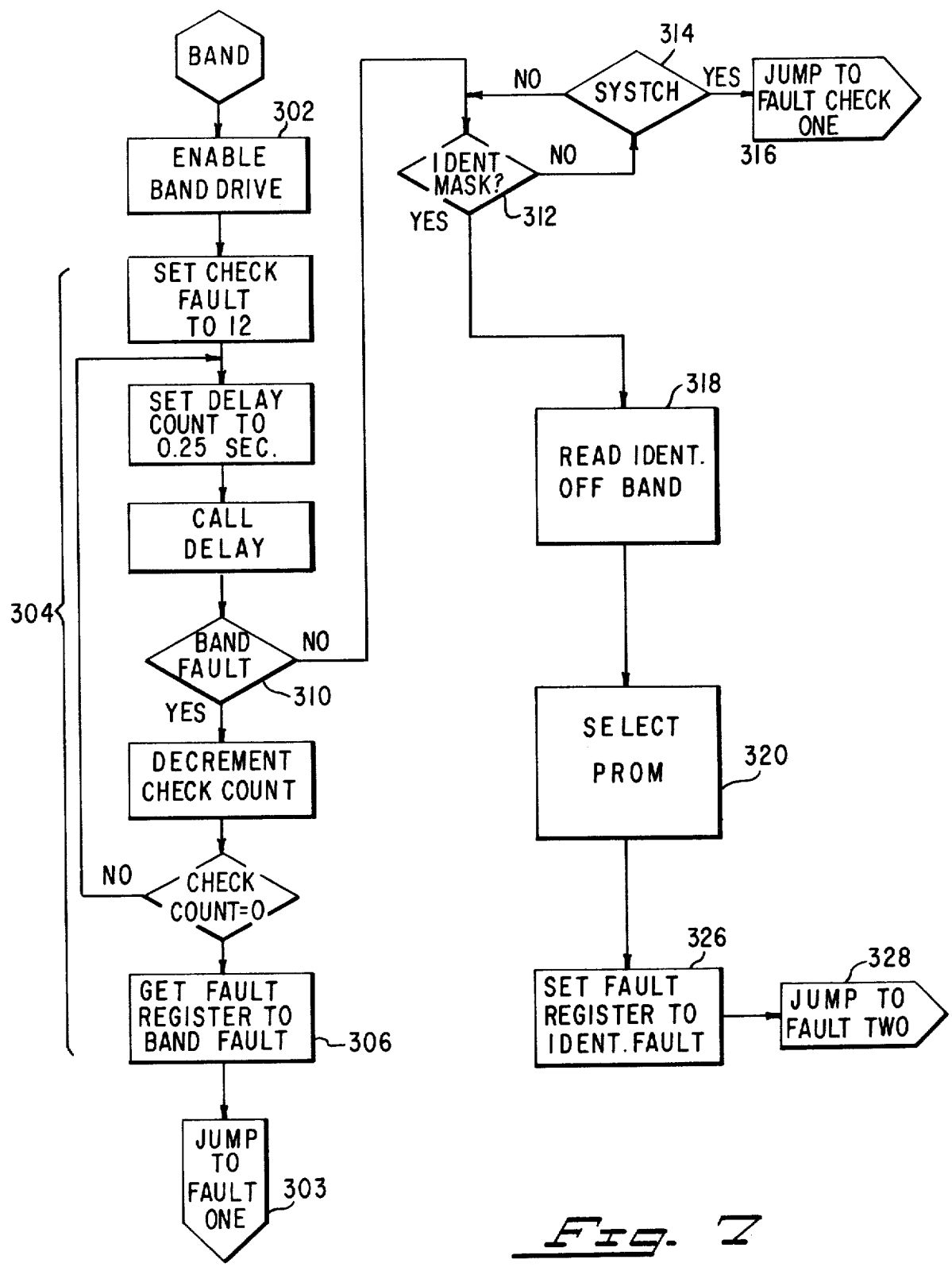
FIG. 7 is a simplified flow diagram showing the BAND mode wherein the band printer is set into a READY state.

The band start up mode is best shown in FIG. 7. Processor module 10 generates a band enable signal coupled to band speed control 194 on timing and status module 16. The band drive signal, BNDRV, is then coupled to the band driver 212. A delay loop 304 is then executed to allow the band to come up to speed. If the band fails to come up with speed within the predesignated time, a fault register is set, together with the appropriate fault routine at 306 and 308. As soon as the band reaches speed, processor module 10 exits loop 304 at 310 and will interrogate character clock control 184 in timing and status module 16 to determine whether or not the identification mask has been set up by character clock control 184. If the mask has been set up, character clock control 184 is then in a condition to detect the identification code on the print band. If not, processor module 10 interrogates fault register 174 as to the status of the signal, system clock, SYSTCH, which will be active whether any of the faults having an input to register 174 are active. If a fault is indicated, processor 10 will select an appropriate fault subroutine at 316, otherwise it will again interrogate character clock control circuit 184 for the presence of a band identifier mask. If the mask has been set up, then the identification band will be read and decoded from the print band at 318 followed by selection of one of the appropriate image PROMs 126, 128 or 130 matching the identifier code read from the print band. Finally, based upon the PROM chosen, processor module 10 will interrogate the identifier from the band to determine if the or print density is ten or fifteen characters per inch, that is, whether or not the hammer bank is to be used as a double spanning hammer or triple spanning hammers. If the identifier code from the band indicates that the print density is fifteen characters per inch, an appropriate status flag will be set at 324 followed by return to the next step in program control. If processor module 10 is unable to identify a matching PROM, such as in the case where the image PROM has not been inserted into the circuitry or the band is not one compatible with any of the image PROMs, processor module 10 will set an appropriate fault register at 326 with a selected jump to a fault routine at 328.

Since processor module 10 has appropriately identified the print band, it will now enter an idle mode of operation while waiting to go on line as diagrammatically depicted in FIG. 8. Processor module 10 will interrogate at 330 the system check signal, SYSTCH, for indication of any of the errors discussed above. If an error is indicated, processor module 10 will branch at 332 to a status check subroutine described in greater detail in connection with FIG. 18. If the system check signal is not active, processor module 10 will continue on to step 334 to check for various faults as set forth in greater detail in connection with FIGS. 17a and b. Following return from the subroutine, fault check, FLTCHK, the READY signal will be set up at 336 by processor module 10 through latch 96 and input/output driver 98 of interface module 14. The system is now prepared to go on line and processor module 10 will interrogate the status of on-line switch 54 at 338 through the control panel of status buffer 48 of interface module 14. If the on-line switch has not been activated, visual output display 66 will be blanked at 340 and the on-line flag to the user will be reset at 342 through latch 74 of interface module 14 to indicate that printer system is still off-line.

Processor 10 will now continue to update the format information provided to it through the control panel. An internal self test flag will be reset at 344 to an initial condition. As discussed below, the self test reset flag is used to determine what type of test mode is to be assumed by the printer system if activated. At 346, processor module 10 will then interrogate whether the top of form switch or step switch has been activated and will execute the appropriate response in the top of form/step subroutine (TOF/STP) if called upon. Following the execution of the TOF/STP subroutine, the certain contents of the general purpose registers will be reinstated at 348 in preparation to execute at 350 a subroutine to initialize the format, form initialize (FRMINT) to set up the printer system to type the proper formated page when called upon to do so. Processor 10 will disable the band drive if no data transfer takes place within a predetermined time. After the end of execution of the form initialize subroutine at 350, processor 10 will return the system to interrogation of the system check signal at 330. The loop continues until the processor is instructed by the operator to go on-line.

If the on-line switch 54 has been activated at 338, processor module 10 will interrogate at 352 whether it has been set on-line to the user or set in a self test mode. If the shelf test switch has been activated, the program address register will be set to the address set up by the self test switch at 354 and an output coupled to visual display 66 through interface module 14 at 356 indicating that the system printer is in a self test mode. After the sequence of events at 356, processor module 10 will set up the on-line signal to the user at 358 and jump at 360 to the address which was loaded into the sequencer during steps 356. If no self test switch has been activated at 354, the address register of sequencer 110 will be set at 362 to the first load location followed by generation of the on-line signal at 358 and the jump to the selected address at 360.

Consider now the subroutines discussed in the idle loop above. FIG. 9 illustrates the top of form/step subroutine. Firstly, top of form switch 58 is interrogated by processor module 10 through status buffer 48. If top of form switch 58 has been set, general purpose registers 150 will be loaded pursuant to program control with the proper format information obtained by processor 10. Processor 10 will then branch to a form feed subroutine (FFEED) within the FORMAT mode, which subroutine will direct processor module 10 through a sequence of steps coupled to power module 18 to bring the top printing line of the next form into position. If the top of form switch has not been activated, processor module 10 will interrogate step switch 56 at 372, again loading the proper information into general purpose address registers 150 at step 374 and branching to a line feed subroutine (LFEED) at 376 within the FORMAT mode. Thus, in this manner, processor module 10 will relay appropriate commands to power module 18 to skip the selected number of lines when the end of the print line has been detected.

Figure 15A:
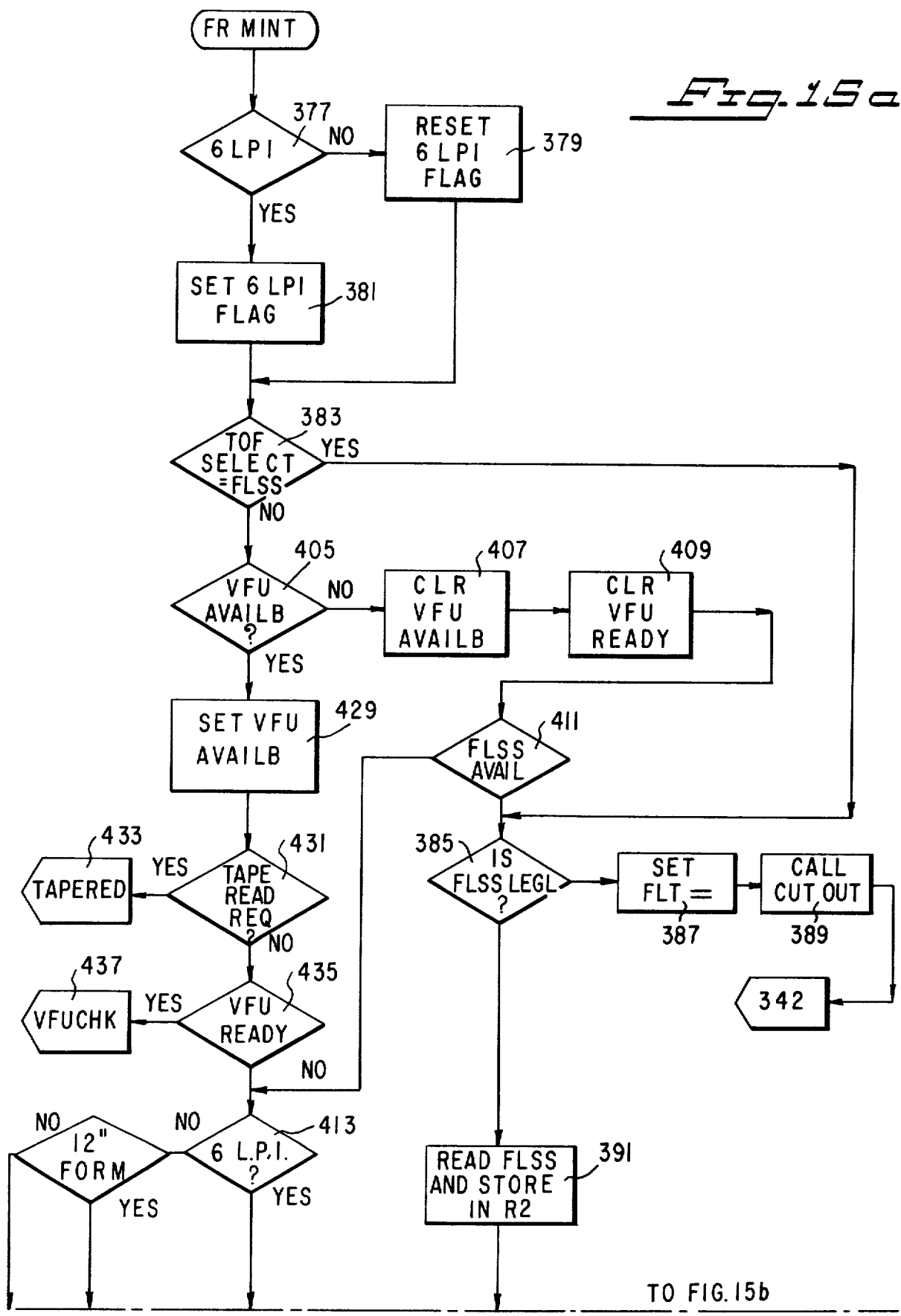
FIGS. 15*a* and *b* are flow diagrams of the form initialize subroutine used during the IDLE mode.
Figure 15B:
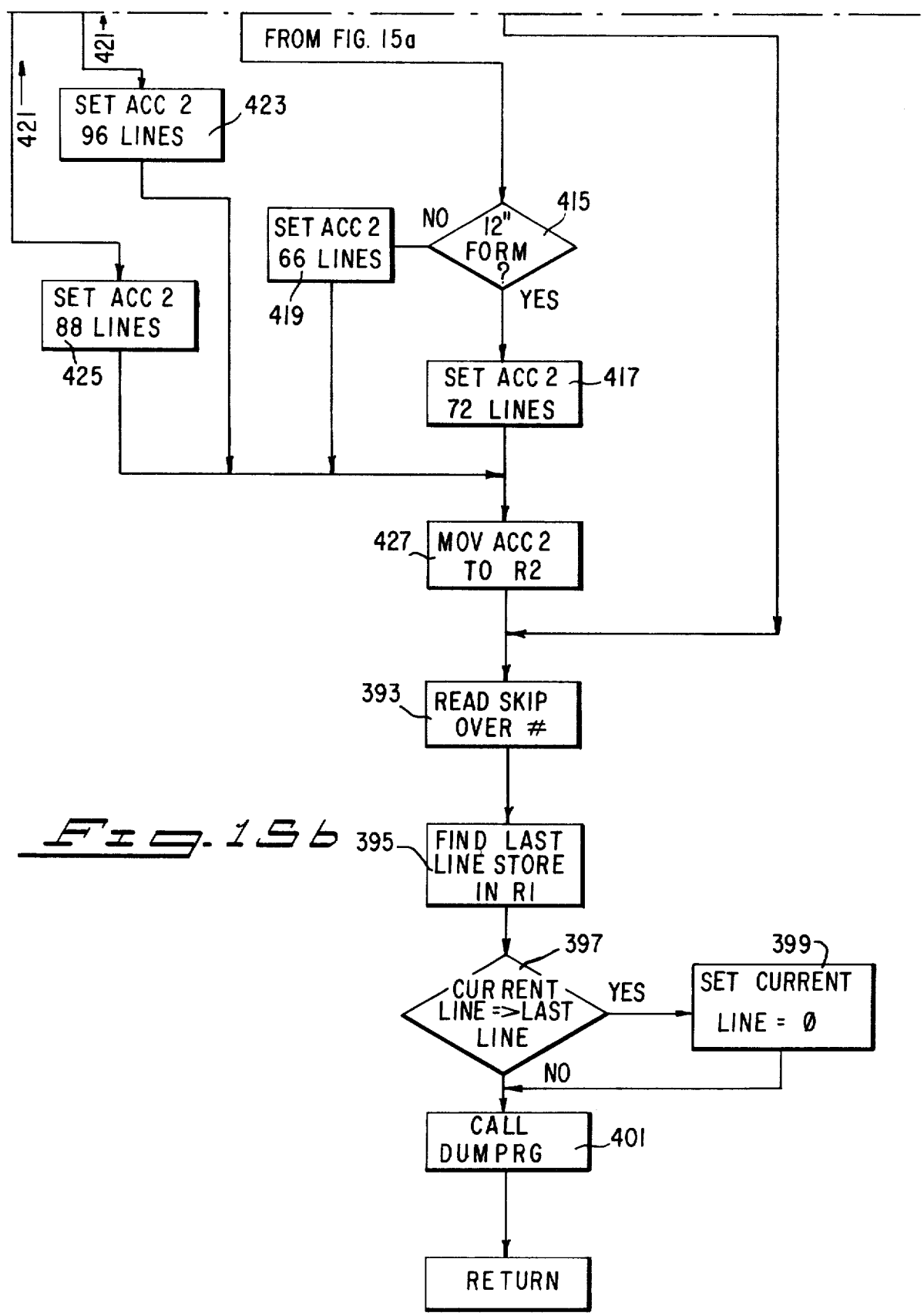

The form initialize subroutine employed in the idle loop is best illustrated in FIGS. 15a and b. Processor 10 will interrogate at 377 six/eight LPI switch 84 to determine whether or not it has been set in the six lines per inch configuration. If not, processor 10 will reset at 379 an internal six LPI flag. However, if the six line per inch switch has been manually set, processor 10 will set an internal six LPI flag at 381. Next, processor 10 will determine at 383 whether it is to format a page according to the configuration of form length select switches 80 and 82 or to follow the instructions which may be contained in VFU 114. If the form length select switches are controlling, processor 10 will examine at 385 the format selected by the form length selection switches to determine whether or not it is a legally permitted format. If not, an appropriate fault flag will be set at 387 followed by the call up at 389 of an appropriate CUT-OFF subroutine discussed in connection with FIG. 11c, and return to the beginning of step 342 in the idle mode. However, if the form length selection switches are set in a legal configuration, the output of ROM 86 is stored within a internal register within processor 10 at 391. The number of skip over lines required between forms is then read at 393 through multiplexer and status buffer 48 from the control panel. The position of the last line of the form is then determined according to the format selected and the position information is stored within another selected register within processor 10 at step 395. At 397, processor 10 will examine the current line to see if it is greater than or equal to the last line of the form. If the processor is set on a line position greater than the last line of the permitted form, the current line position will be reset at line "0" or the first line of the form at step 399. In any case, processor 10 will return the updated contents of the various registers holding the updated format information into a scratch memory contained within line buffer 118 during step 401. At 403, processor 10 will leave the subroutine, FRMINT, and return to the main program control.

However, if at step 383, it is indicated that the desired format information is contained within VFU 114, processor 10 will interrogate VFU 114 at 405 to determine whether or not the VFU information has been coded into the VFU memory map or whether the VFU option is available to the printer. If not, an internal VFU availability flag within processor 10 will be cleared at 407 and an internal VFU READY signal serving as part of a handshake between VFU 114 which is treated as an outside user, will be cleared at 409. At this point, processor 10 will seek at step 411 to determine whether or not the form length selection switch format may be available instead. If it is, processor 10 will enter step 385 and follow the sequence discussed above. If not, processor 10 will nevertheless interrogate six/eight LPI switch 84 to determine whether or not the operator has indicated whether eight lines or six lines per inch is required. If six lines per inch is required, processor 10 will interrogate at 415, ROM 86 to determine whether an eleven inch or twelve inch form has been requested by the operator. If the twelve inch form is required, the number seventy-two will be read into accumulator 164 of processor 10 at 417 to indicate the maximum number of lines on the form. If not, an eleven inch form is required and accumulator 164 will be loaded with the number, sixty-six at 419. If, at step 413 six lines per inch is not indicated, then processor 10 will assume that eight lines per inch is required. Again, processor 10 will interrogate at 421 interface module 14 to determine whether or not an eleven or twelve inch form is required. If a twelve inch form is required, accumulator 164 will be loaded with the number ninety-six at step 423, otherwise accumulator 164 will be loaded with the number eighty-eight at step 425. In any case, the contents of accumulator 164 will be moved to an appropriate register elsewhere within processor 10 at step 427 and the remaining registers will be loaded with the appropriate information beginning with step 393 as discussed above.

However, if at step 405 VFU 114 is available, an internal status flag will be set within processor 10 at step 429 to indicate VFU availability when later required during the program control. Processor 10 will then interrogate multiplexer 72 at 431 to determine whether or not a tape read REQUEST signal has raised by tape reader 70. If it has, processor 10 will enter a tape read subroutine, TAPERD, at 433 and discussed in greater detail below in connection with FIGS 19a and b. If not, processor 10 will determine at 435 whether or not the internal handshake signal, VFU READY, has been raised. If VFU READY is active and no tape read REQUEST signal has been received, then a malfunction has occurred and processor 10 will move to a VFU system check at 437 to determine the nature and location of the error. The subroutine, VFUCHK, will interrogate the VFU operational mode and generate the appropriate fault flags and communicate the status to the operator through visual output 66 on interface module 14. However, if there is no VFU READY signal at 435, processor 10 will continue will the form initialize sequence at step 413 as discussed in detail above. The idle loop is repeated with sufficient repetition such that if the format is to be set by the VFU, eventually a tape read REQUEST will be raised at step 431 and the VFU information read in.

Figure 10:
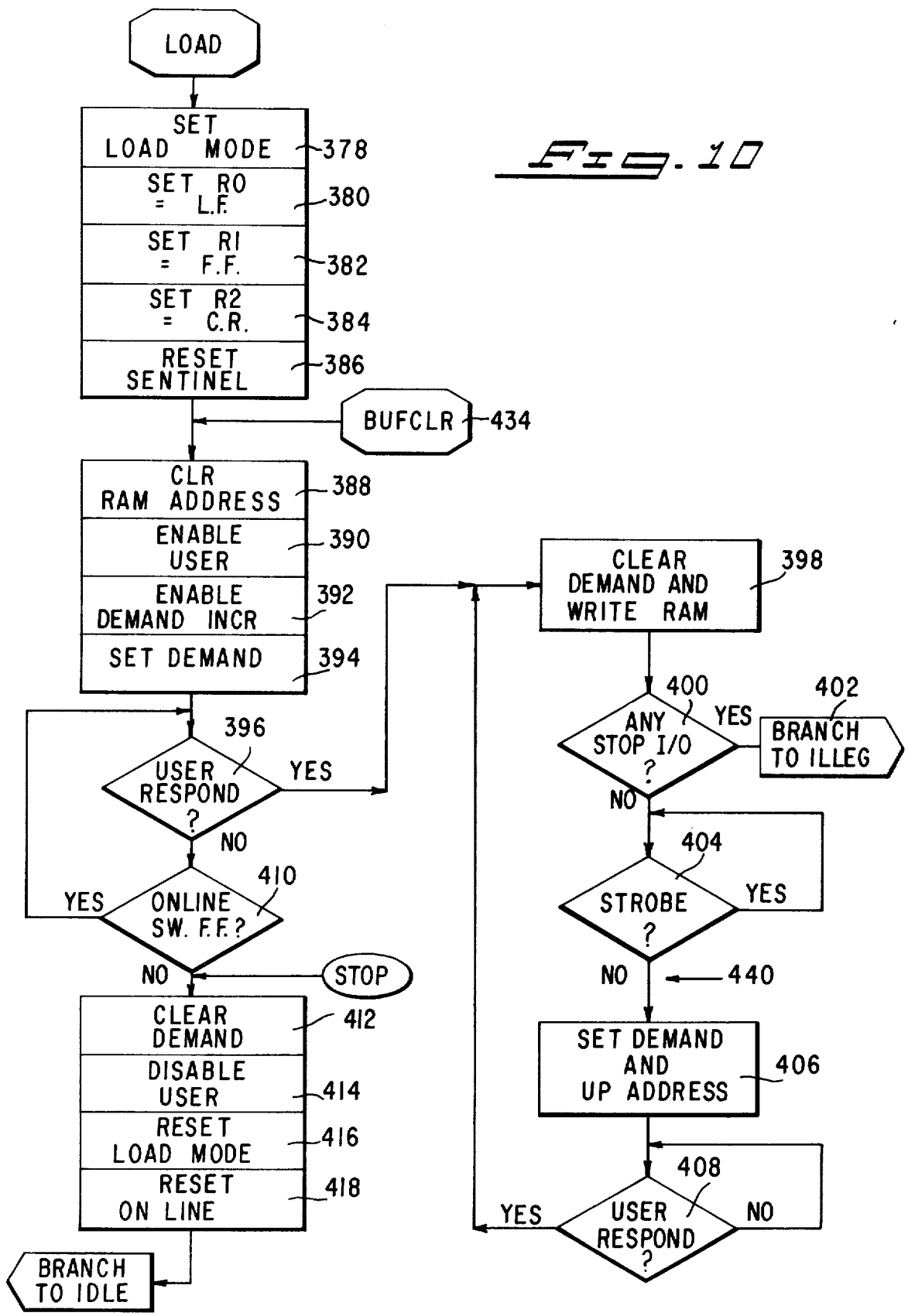
FIG. 10 is a flow diagram of the LOAD mode wherein data is loaded into the line buffer within the central processor.

Referring now to FIG. 10 which depicts LOAD operation, after processor 10 goes on-line it will exit the idle mode and will now be prepared to accept data into line buffer 118. Processor module 10 will initialize itself to load data by setting an internal flag bit at 378 to indicate that it is about to enter a data loading mode and will set appropriate registers with the data input into processor 10 with respect to line feed at 380, form feed at 382, carriage return at 384 and will reset at 386 a register corresponding to a sentinel bit, which is a ninth bit included with the eight bit byte used for internal processing which will be described below. Line buffer address register 156 will then be cleared at 388 which will also serve as the entry point should a user instruction, such as buffer clear, BFCLR, be received. An on-line or enable signal will be sent at 390 to the user to signify to the user that the printer system is on line. A DEMAND latch will be enabled and the DEMAND signal sent to the user at 394 indicating that the printer system has been prepared and is ready to accept a byte of information. The information sent by the user may either be a data strobe or a buffer clear instruction. If the user responds by a data strobe at 396, the DEMAND signal will be cleared and the data written into line buffer 118 at step 398. Simultaneously, the information, data or a control command will be noted routed on load bus 121 through multiplexer 124 and to the selected image PROM 126, 128 or 130, selected during band identification. The PROM will contain a look-up table which will present an output indicating whether the loaded information is legal, i.e., a printable character included on the print band or an acceptable control command, or is illegal. If the information received is not a legal data code, processor module 10 will move at 400 to a mode, ILLEGAL, described in greater detail in regard to FIGS. 11a, b and c. If the information obtained is acceptable data, processor module 10 will wait at step 404 until the user's strobe is dropped. Once dropped, the DEMAND signal is once again communicated at 406 by processor module 10 through latch 96 and input/output driver 98 of interface module 14 to the user and the address of register 156 is incremented at 406 to address the next location in line buffer 18. Processor module 110 will again wait until the user responds by setting up a data strobe. When the strobe goes active, processor module 10 returns to step 398, clears the DEMAND request and writes the information into the RAM location address. However, if at step 396, the user had not responded to the initial demand, processor 10 would have interrogated at 410 the status of the byte corresponding to on-line switch 54. If the on-line switch had been activated, processor 10 would have waited for a user response by returning to step 396. If the on-line switch has been deactivated, processor would clear its DEMAND signal at 412, disable the user at 414 indicating that it was disengaging from any interface with the user system, reset the load mode at 416 to signify that it was no longer preparing to load data, and reset the on-line flag at 418 in preparation to go off-line. Processor 10 would then return to the idle mode discussed above.

Figure 11B:
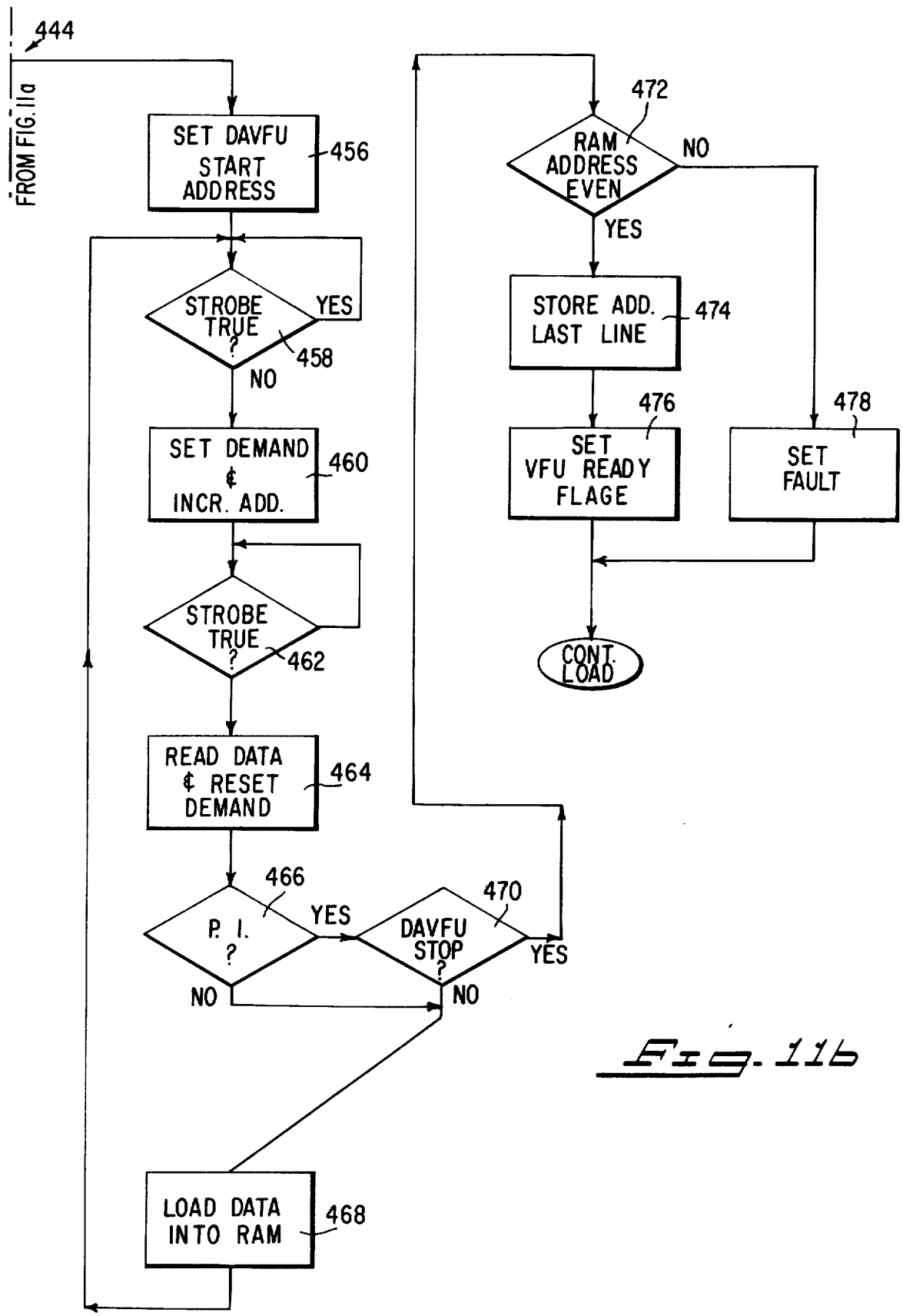
FIGS. 11a and b are is a flow diagram of the ILLEGAL mode wherein the paper instruction commands are identified, the VFU loaded and the illegal characters set up for identification.

Assume, for example, that a step 400, that an unacceptable data byte had been received and processor 10 moved to the ILLEGAL mode, best illustrated in FIGS. 11a, and b. If an ILLEGAL data byte has been received, processor 10 will disable the user at 420 and determine at 422 whether or not the internal VFU flag has been set to signify that VFU 114 has been loaded with format instructions. If not, processor 10 will examine the byte to determine whether or not it is a line feed instruction, a form feed instruction or carriage return instruction. If the byte, at 424, 426 or 438 is any of these instructions, processor 10 will write at 430 a "1" in the sentinel bit of the instruction word, disable the demand counter, the user, clear line buffer address register 156, load the proper code for a blank space into accumulator 164 and enable the output of line buffer 118. Processor 10 will then move into an edit mode discussed in greater detail in FIG. 12. If the illegal byte is not interpreted as a line feed, form feed or carriage return, processor 10 will examine the byte at step 432 to determine whether or not it is a buffer clear instruction from the user. If so, processor 10 will enter the load mode at step 434 as shown in FIG. 10, otherwise it will continue to examine whether or not the data byte transmitted is in excess of the one hundred thirty-six character line width used in the illustrated embodiment. If the byte is the one hundred thirty-seventh character, the line buffer address will be decremented at step 438, the user enabled again and the load cycle reentered at step 440 as shown in FIG. 11a, to request the next data byte. As described above, the illegal information beyond one hundred thirty-six character will simply be dropped until an acceptable control command has been received.

However, if at step 422 (FIG. 11a) the VFU option is available and the received byte is a paper instruction, processor 10 will examine the byte to determine whether or not it is a user code indicating a direct access VFU command (DAVFU). Since step 442 indicated that it is a paper instruction and step 444 indicates that it is not a start code, VFU 114 must be in the READY state unless there is a malfunction in which case, a fault flag is set and CPU reenters the ILLEGAL mode at step 424. If VFU 114 is ready, processor 10 examines the paper instruction to determine whether or not it is a user encoded direct access VFU STOP instruction signifying that no further (or any) data is available for printing subject of VFU control. If not, processor 10 enters the edit routine discussed below in connection with FIG. 12. If at step 450, the paper instruction is a user stop code, the VFU address in the VFU address register 113 is set to the initial location and processor 10 returns to step 404 of the load sequence.

However, in the case where the paper instruction is a DAVFU start, processor 10 moves from step 444 to set the initial VFU address at step 456 in VFU register 113. The user's strobe is interrogated at 458 through interface module 14 by means of latch 90 and input/output receiver buffer 88 until it goes active. Processor 10 then sets the demand signal at output 30 on interface module 14 and increments the address of VFU address register 113. If the data strobe from the user is active, user data is read into the VFU memory map as step 464 and the demand is reset. The next byte is then examined to determine whether or not it is a paper instruction or an additional unit of data. If it is data, then it will be loaded into the VFU memory map at step 468 and the cycle returned to step 458. Format data continues to be loaded into the VFU memory map until a paper instruction is received. When a paper instruction is received, it is examined to determine whether or not it is a DAVFU STOP instruction. All other instructions other than the STOP instruction are ignored. If a STOP instruction has been received, the RAM address is examined to determine whether it is an even or odd number. The VFU address must be an even address unless a malfunction has occurred since the VFU instructions and data are twelve bits in length and are split into two even six bit bytes in order to be handled by the standard eight bit byte buses of the present invention. The first 6 bits are latched into latch 115. The second 6 bits are then presented to buffer 117, while the first 6 bits are presented to buffer 119. All 12 bits are then simultaneously loaded into RAMS 112a, b, c. However, each 6 bit byte has a distinguishable VFU address and read as required sequentially through buffers 121. The address of the last location of VFU memory used is stored and the VFU READY flag set in one of general purpose registers 150 to indicate the VFU 114 has been loaded. However, if the address was odd at step 472, a fault flow will be set at 478. In either case, processor 10 returns to the load mode with step 404.

Figure 12:
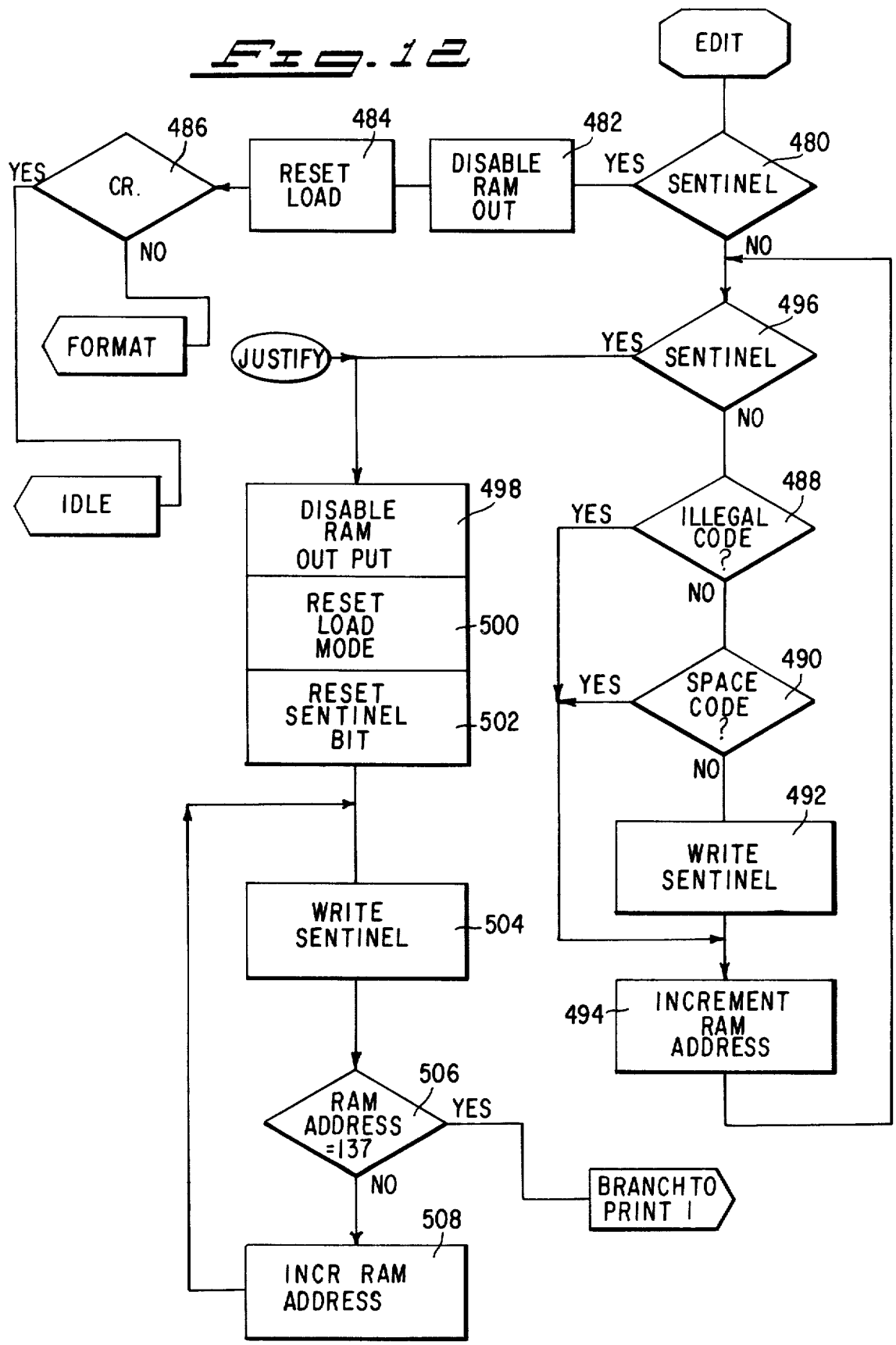
FIG. 12 is a flow diagram of the EDIT mode wherein the illegal characters are identified and the commands distinguished from the legal data.

When processor 10 has reached the edit mode, it has determined that an illegal word has been received. As shown in FIG. 12, the sentinel bit of the word is checked to determine whether it is a command for which the bit has been set at 430 or an illegal data word. If a step 480 it is determined that it is not a data word, the output of line buffer 118 will be disabled at 482 and the load flag reset signifying that the printer is leaving the load mode. However, in a case where the instruction is a carriage return, processor 10, at step 486, will enter the idle mode of FIG. 9 to await further data input for that print line, such as underlining or overstrikes, otherwise it will advance to the FORMAT mode of FIGS. 14a, b, and c in order to move paper if required. The sentinel bit is again interrogated at 496 for reasons which will become apparent. If the illegal word is indicated as being a data word, processor 10 at step 488 will determine whether or not the word is one of the permissible characters within the selected image PROM as indicated by the output from the lookup table in the image PROM. If not, processor 10 will determine whether or not the character in question is a blank space. If not, the sentinel bit which was reset at step 386 will be set. In either case, the address line buffer 118 is incremented and the sentinal bit examined again at step 496 for the next word in line buffer 118. When a command is examined at step 496 its sentinel bit will have been set at step 435. Processor 10 will then disable the line buffer output at 498, reset the load flag at 500 together with sentinel bit. Zeros are then written into each bit of the remaining portion of line buffer 118 in the loop consisting of steps 504, 506 and 508, until the one hundred thirty-sixth character of the line has had its sentinel bit set at which point processor 10 advances to the print mode. In this manner the sentinel bit may be used in the print mode to distinguish printable data from commands.

Figure 13:
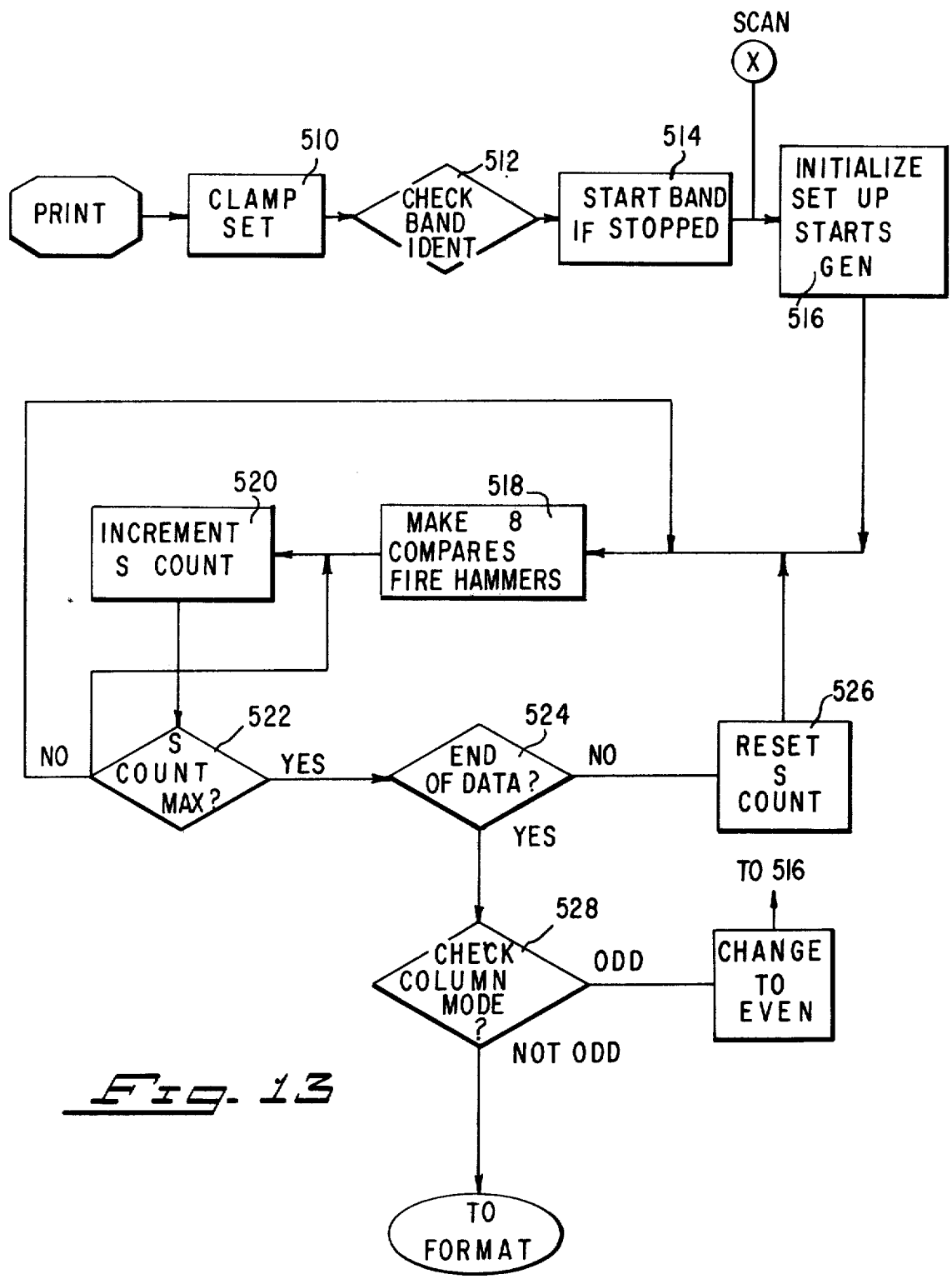
FIG. 13 is a simplified flow diagram of the PRINT mode wherein data loaded into the line buffer is synchronized with timing signals from the timing and status module to generate the appropriate hammer firings.
Figure 14A:
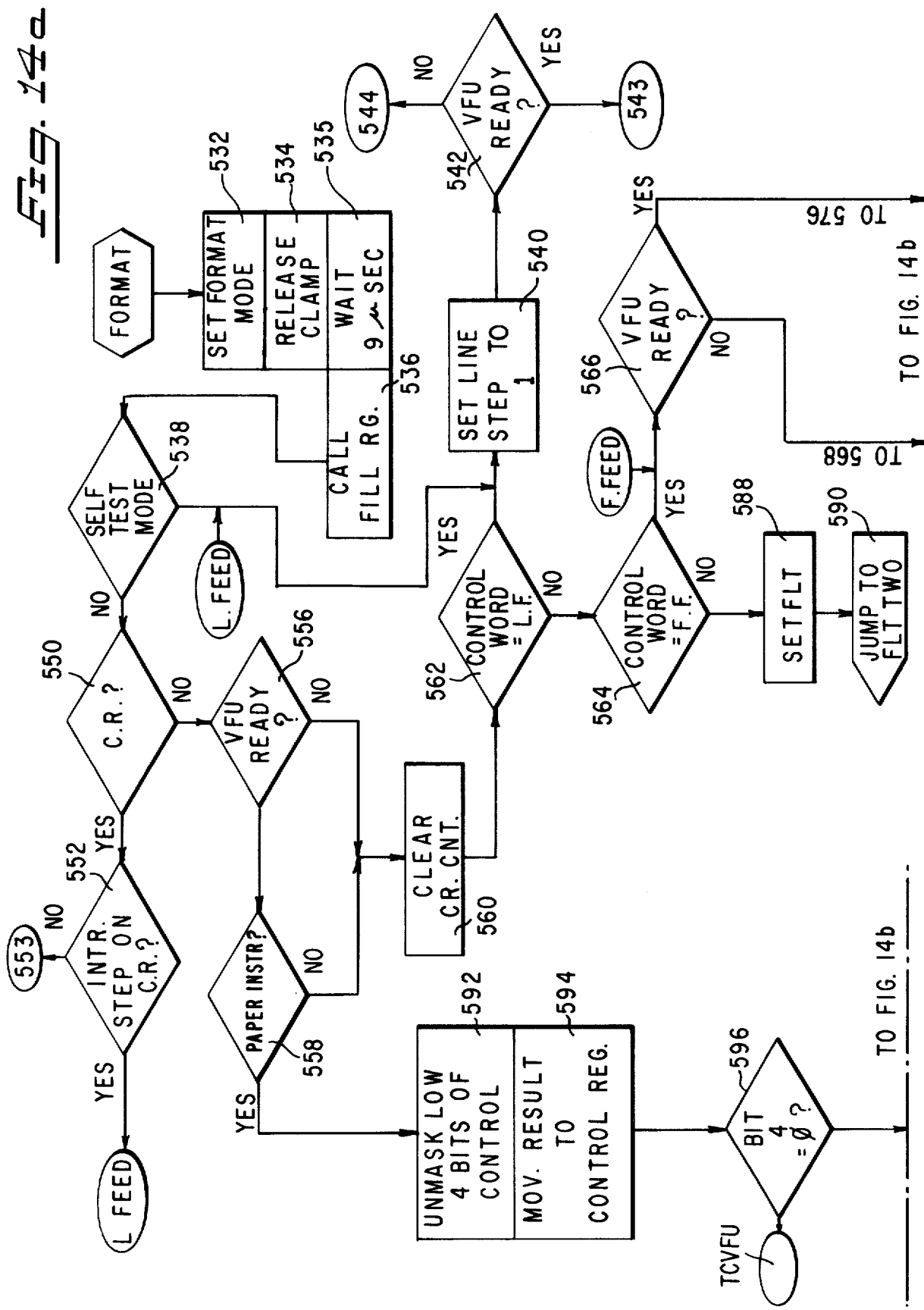
FIGS. 14a, b and c are simplified flow diagrams of the FORMAT mode in which the printer system is prepared to move the hardcopy printout, the designated number of lines.
Figure 14B:
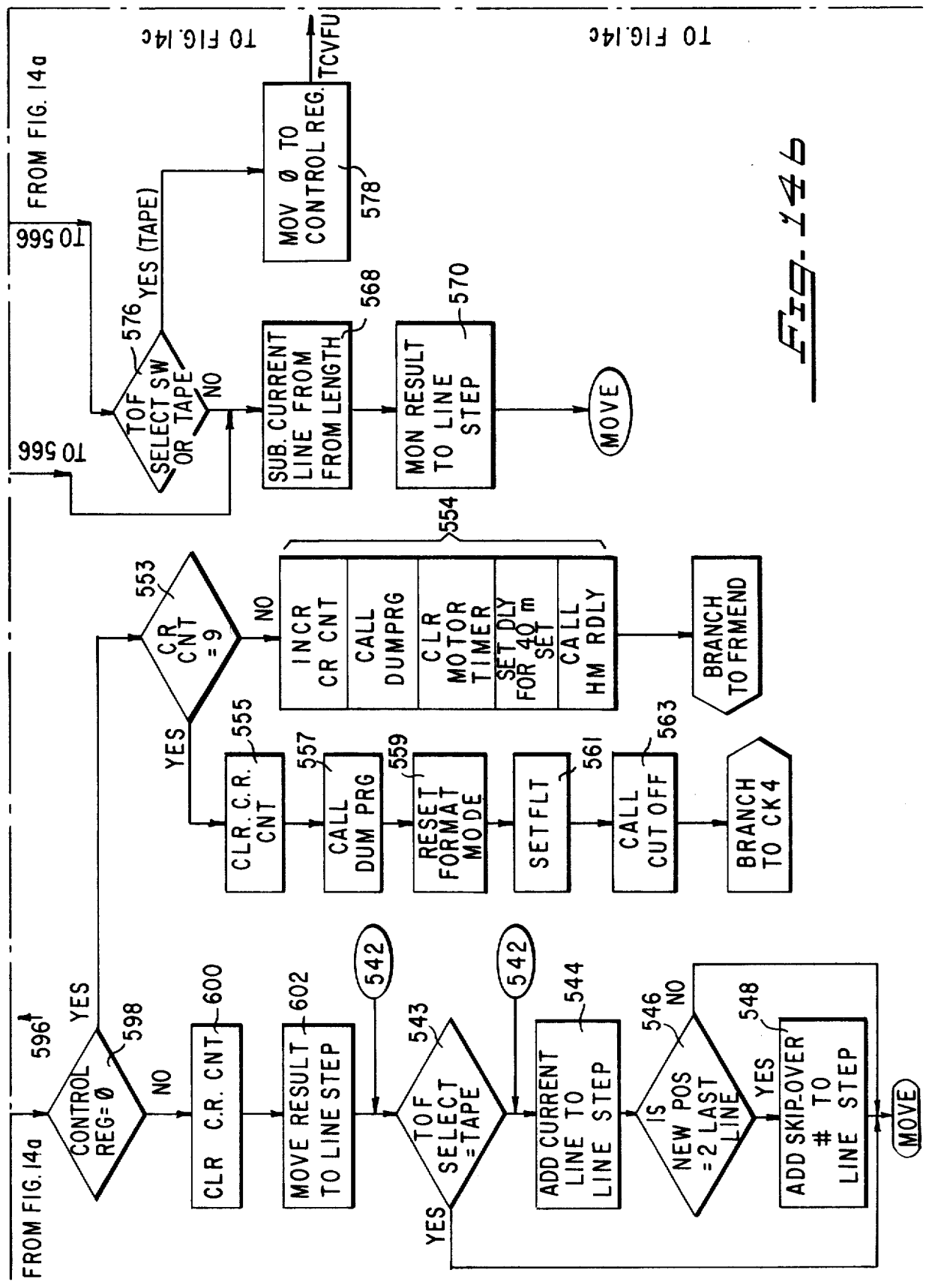
Figure 14C:
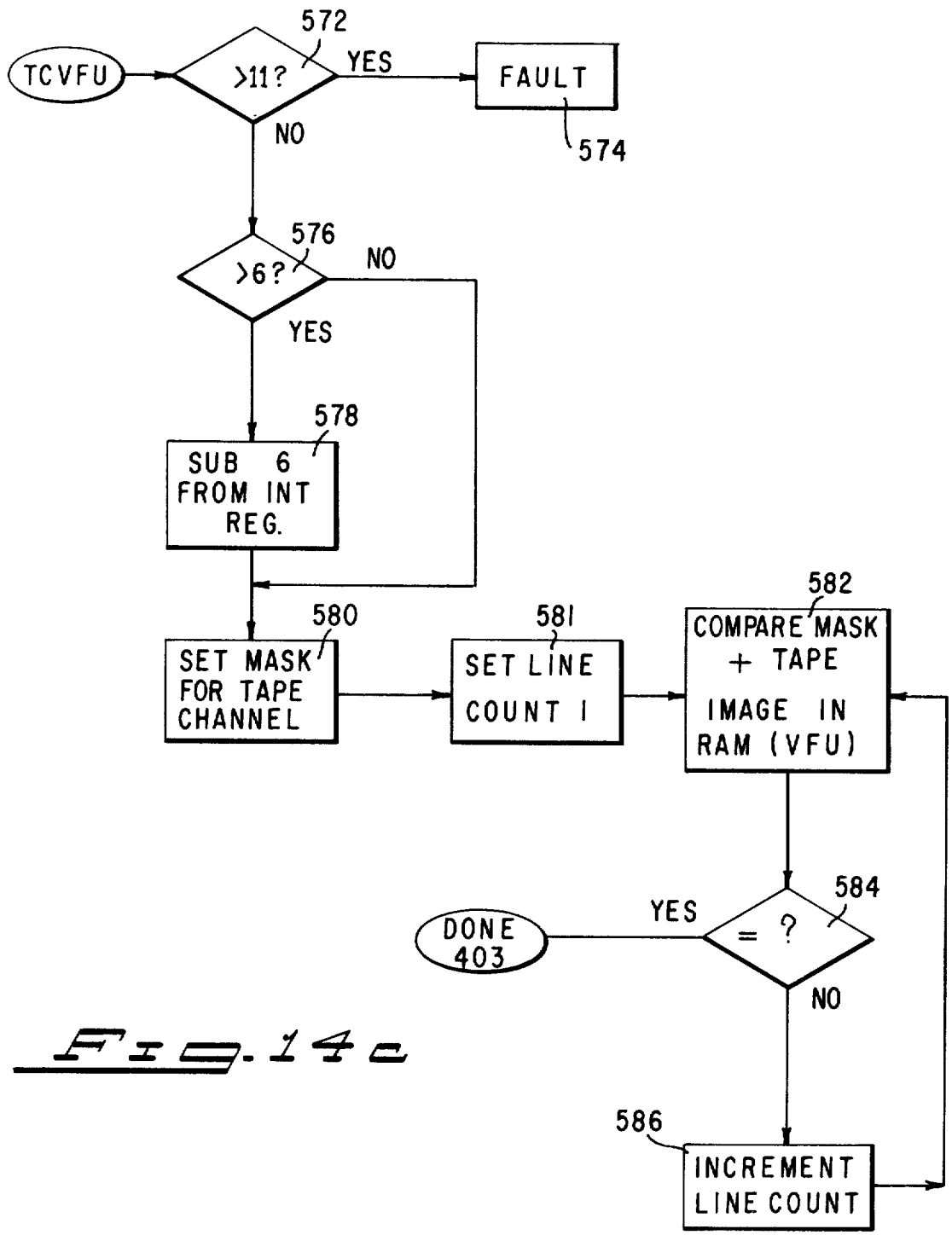

FIG. 13 is a simplified schematic of the print mode. The clamp solenoid current is pulsed on at step 510 by sending the proper word in address bus 28 to latch 208 in power module 18 thus enabling clamp 216. Band faults are examined and interrogated as step 512 by sampling the status bytes in fault register 174 on timing and status module 16. The band is started and all internal registers are initialized and an internal S generator is started which is synchronized with the hammer trigger signals generated in hammer driver module 20. The S generator is used in a hammer matrix circuit within hammer driver module 20 to fire the hammer current circuits. Each hammer will be associated with one of the S pulses, each offset by a duration, t. Since each hammer is less in width than the font character spacing, the duration of a character period will exceed the font character's travel time by across a hammer face by the time increment, t. The offset between S pulses and their selective assignment to certain hammers compensates for the discrepancy between font character spacing and hammer width. When, for example, hammer bank is used as double spanning hammers, the odd cycle will be printed first, followed by the even. Therefore, in a one hundred and thirty-six character line, sixty-seven characters will be in odd columns and sixty-seven in even columns. For any given character position in the odd or even cycle, processor 10 will make eight comparisons since eight of the hammer will be aligned with a type font for each given S pulse including, of course, an appropriate offset for hammer flight time. Nine such pulses occurring during a single character period which is the time required for the band to move to the next character font position. Where a comparison is valid, a firing instruction is set on out-bus 24 and coupled to the latches driving the hammer matrix of hammer module 20. The S count is then incremented at step 520 and compared against its maximum count of nine at step 522. If the maximum count has not been reached, an additional eight comparisons are made on the next S pulse at step 518. If the maximum count of S pulses has been reached, processor 10 will interrogate at step 524 whether all the data for that line has been printed. If not, the S count will be reset at step 526 and the comparison cycle restarted with step 518. However, if all the odd data has been printed for the selected print column, it will then be determined at step 528 whether the printer is printing the odd columns or the even columns. In the illustrated embodiment, the odd columns are printed first. Therefore, if the processor is in the odd column print mode, it will be changed at 530 to print in even column mode and reenter the print cycle with step 516. Otherwise, processor 10 advances to the FORMAT mode, described in connection with FIGS. 14a, b and c in order to move the paper. The flexibility of the present invention can be appreciated now when it is noted that the print mode functions with equal ease whether printing two, three or any number of columns per hammer. Moreover, the printing mode is a self adjusted parameter during band identification not requiring operator intervention or recognition.

In the FORMAT mode, a format flag will be set at 532 to disable the master clear so that the printer system cannot be interrupted in the middle of a paper step to leave the paper advanced to a "non-line" position. The solenoid clamp will be released at 534 to permit movement of the paper and after an appropriate delay to allow mechanical response, general purpose registers 150 will be loaded at 536 with the control board format information. If processor 10 has been set in the self test mode, it will move from step 538 and set the line step automatically to single spacing at 540. The VFU ready signal will then be sampled at 542 to determine which of the test data is to be printed under VFU control or not. If VFU 114 is not ready or is otherwise unavailable, processor 10 will skip to step 544 and add the line step to the current line number. If it is the last line on the form, the proper number of skip over lines to reach the top of the next form will be added in step 548, otherwise the paper will be advanced accordng to the line step in a subroutine, MOVE, described below. However, if at step 542 the VFU is ready, then processor 10 then determines at 543 whether it is to print a format controlled by the VFU tape or form length select switches.

However, if at step 538 processor 10 is not in a self test mode, it will look for a carriage instruction at 550. If one is found, it will further look to see whether or not a paper step instruction is included with the carriage return in step 552. If not, the carriage count is incremented, the contents of the general purpose register will be reinserted into line buffer 118 and a hammer settling delay, HMRDLY, will be called. If a paper step is included, the format mode will be reentered at the line, LFFEED, insert point at step 540. However, if at step 550 there is no carriage return, the VFU status will be interrogated at 556 and a paper instruction sought at 558 if the VFU is ready. If VFU is not ready, or if ready, no paper instruction has been received, the carriage count will be cleared at step 560. Carriage return count is kept of the number of carriage returns received in order to prevent excessive strikeovers which would penetrate the paper and cause mechanical damage to the print platten. If the control word received is a line feed instruction, then processor 10 will move from step 562 to 540 to execute the requested line feed. However, if the control word is a form feed instruction, processor 10 will determine at 560 whether or not the VFU is ready. If at step 564, the instruction is not form feed, then clearly a malfunction occurred and the fault is set, together with an appropriate fault routine in steps 588 and 590. If not, processor 10 will determine at 576 whether form length switches or the tape instructions are to control the paper movement. If the form length switches control, the current line is subtracted from the form length at 568 and line step is set equal to the difference in step 570. Processor 10 will then enter the MOVE mode to move the paper to the next top of form. If tape commands are to control paper movement, processor 10 will determine at 572 if the appropriate interval control register used to read the tape has a content greater than 11. Since the channels of tape data number 0 through 11, any greater number indicates a fault which will be set and displayed at 574. Further, since only the first six tape channels are the only information bearing channels in regard to tape movement, the contents of the control register is reduced at 578 if need be to a number 0 through 5. In any case, a mask is set at 580 to view only a selected channel, e.g. the fourth. The tape image as it appears in the VFU memory map is then compared in 582 to the mark. If at 584 there is a match, indicating a tape channel command, the line count within the VFU memory stops and processor advances to the MOVE subroutine. If there is no mask match, then the line count is incremented at 586 and the process repeated from step 582.

Step 582 may also include a decision point wherein the line count is compared against a line limit 143, which is the industry standard for tape loops. If the line count is greater than 143, a malfunction is indicated, and an appropriate fault flag is set and display initiated through visual display 66.

However, if at step 558, a paper instruction is received, the lower four bits of the instruction is masked at 592, moved to an appropriate control register at 594 and the informtion bit examined at 596 to determine whether or not the paper instruction received is a tape channel command or skip command. If a tape channel command, processor 10 will jump to step 572. However, if it is a skip command, the number of lines to be skipped will be examined at 598. If the number is "0", the skip command is interpreted equivalently to a carriage return and processor 10 will jump to step 553. If the skip command indicates that a certain number of lines is to be skipped, the carriage count is cleared at 600 and the number of lines to be skipped will be loaded into the line step register at 602. Again, processor 10 will examine at step 543 whether the form format is to be dictated by the form length selection switches or by the tape control or tape control image contained within the VFU.

The MOVE mode is a program controlled generation of addresses coupled to address bus 28 and coupled into address latch 208. The addresses are decoded and drive three phase driver 214 and power module 18. By appropriate computer control, gradual start-ups and stops may be programmed into the phases output from driver 214 and coupled to the three phases stepper motor driving the paper. Similarly, the amount of movement, such as when printing in the six or eight lines per inch configurations, can be controlled by appropriate motor commands generated by processor 10. Once the MOVE mode is completed, processor 10 will return to the IDLE mode and begin the sequence of modes, LOAD, ILLEGAL, EDIT, PRINT, FORMAT and MOVE, for the next print line. However, there are several subroutines which may be entered at appropriate places, as indicated, during execution of any of the above modes.

The subroutine, self test, SELTST, is one such mode referenced above and is best illustrated in FIGURE 16. SELTST initiates one of two different types of patterns to internally generate data to enable the printer to test itself in regard to each phase of operation. After the self test subroutine is entered, the load flag is set indicating that processor 10 will consider that it is entering a standard data load mode. Address register 156 will be set to the self test character location in one of the image PROMs at 606. The byte representing the self test character will be moved to a first working internal register at 608 and a character count set to −136 at 610. The sentinel bit will be reset as in the usual load mode at 612. Processor 10 will then examine whether the self test pattern is to be shifting or repetitive at 614 by interrogating the self test switches on interface module 14. If the pattern is to be repetitive the byte representing the self test character will be moved from the working register to accumulator 164 at step 616. For reasons which will become apparent, the contents of accumulator 164 will be returned to the first working register at 618 and moved at 620 to a second working register. The contents of the first working register will be stored in line buffer 118 at 622. Buffer address register 156 will then be cleared in step 624 and the sentinal bit rewritten at 626 to permit proper printing of the self test character byte. The contents of the second working register will then be loaded into line buffer 118 at 628. If the pattern, as we have assumed, is not a shifting pattern, processor 10 at 630 will then increment the line buffer address at 632, increment the character count at 634 and then examine the count at 636 to see whether all one hundred and thirty-six characters of the print line have been printed. If not, processor 10 returns to step 626 and the same contents of the second working register is loaded into line buffer 118 at step 628. As a result, the same character is printed across the entire line width. If the last character has been printed, processor 10 will return to step 430 of the illegal mode and ultimately return to idle.

However, if at step 614 a shifting pattern is indicated, the contents of the first working register is incremented at 638. Thus, the next or second printing character appears in the first working register. Processor 10 will check at 640 and 642 to determine that the character which is stored within the first working register is in fact within the lower and upper range respectively of legally printable encoded characters. If the contents of the first working register is not within the permissible range, the contents of accumulator 164 will be set equal to the first permissible character at 644. The contents of accumulator 164 will then be moved to the first working register in step 618. If at step 642 the character is a legally printable character, the contents of the first working register will be loaded into the second working register at step 620. The contents of the first working register, now containing a second character, is stored in the RAM which was set at the address referring to the self test character to be initially used. Address buffer 166 is cleared at 624 and loaded into the first line buffer location in step 628. Now, in the shifting pattern at step 630, the contents of the second working register is incremented at 638 to the next printable character. If at 640 the contents of the second working register is not greater than the last permissible printable character, the RAM address will be incremented at 632, the character count incremented at 634 and the loop previously described, continued until the entire pattern of printable characters has been set forth on the print line. In the event of a malfunction at step 640, a nonprintable character will be reset to the first printable character at step 642 and the shift pattern generated as usual. However, during the print mode for the subsequent line, step 622 will have set the second printable character as the first self test character to be printed. Therefore, the next line will start with the second character and the entire set of characters will be repeated across the length of the line in order, until the line is completely filled by multiple replications of the character set. Thus, the first print column in a number of print lines will vertically present the character set and hence create a shifting pattern so that each permissible character can be printed in each column in order to test every conceivable printing event.

Figure 17A:
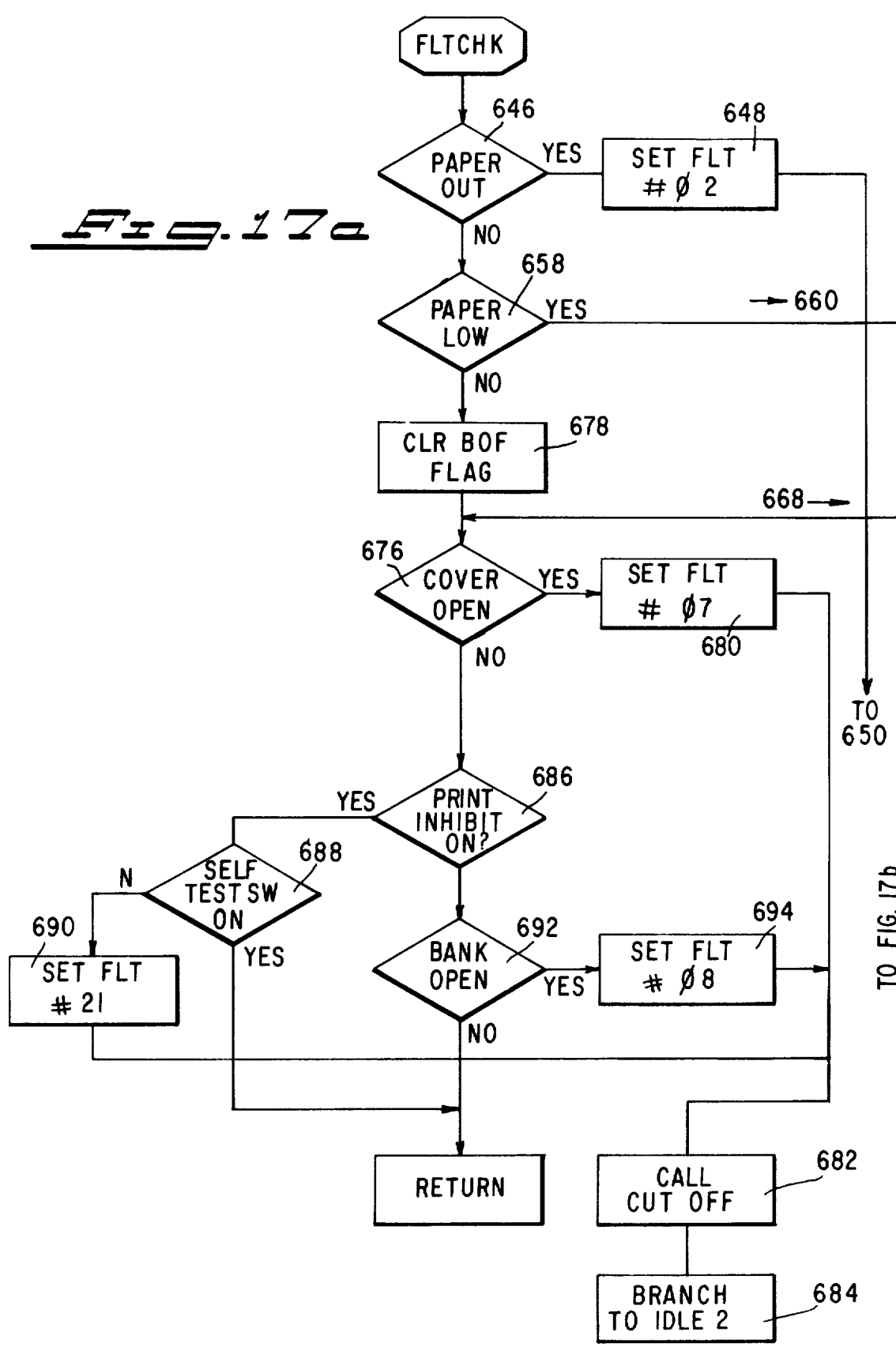
FIGS. 17*a*, *b* and *c* are flow diagrams of a fault check subroutine which can be selectively entered to interrogate the status of a number of fault indicators.

The fault check subroutine, FLTCHK, is illustrated in FIGS. 17a and b. Firstly, processor 10 will determine whether or not the interlock switch showing that the paper supply is out has been set. If so indicated at step 646, a fault number will be set, as "02" at 648 and the processor will jump to the CUTOFF subroutine at 650 to be followed by interrogation of the system check signal, SYSTCH, at 652. If the system check signal is valid, processor 10 will branch to a status check subroutine discussed in greater detail in relation to FIG. 18 below. If the system check signal indicates that no error is shown, processor 10 will jump to subroutine, TOF/-STEP, at 656, previously discussed in relation to FIG. 9. Similarly, the paper load interlock will be interrogated at 658. If the interlock is valid, the bottom of form flag will be interrogated at 660. If the bottom of form flag is not set at 662, the VFU will be interrogated for the READY condition at 664. If the VFU has been loaded with format instructions, processor 10 will determine whether it is to follow the tape instructions or form length select switches at 666. If the tape controlled instructions in the memory map of the VFU are to control, then the processor 10 will determine whether it is at the top of form at 668. If the form length select switches are to control, processor 10 will interrogate the line position at 670 to determine whether or not it is on the first line. In either case, step 670 or 668, if the top of form is reached, the bottom of form flag will be set at 672 and the proper fault error flag set at 674 for visual display followed by a call at step 650 to the cut-off subroutine. If the printer is either on the "0" position line or top of form, the processor 10 will return to the main fault check sequence by interrogating the cover interlock switch at 676. If the paper interlock switch was not low, the bottom of form flag would be reset at 678. Thus, not until the second pass through FLTCHK will the bottom of form flag be set enabling the balance of the form to be appropriately printed. Thereafter, the appropriate fault will be set at step 674 directly from step 662. If the cover interlock has been activated, an appropriate fault code will be set at 680 followed by recourse to the CUTOFF subroutine at 682 and ultimately return to step 342 of the idle mode. If cover interlock has not been activated, processor 10 will examine a manually, internally set switch, primarily intended for maintenance, a print inhibit switch at 686. If the switch has been set and processor 10 is in a self test configuration, the condition will be ignored and FLTCHK exited at 688. However, if the printer system is not in a self test mode, an appropriate fault signal will be set at 690 to indicate to the operator that the printer system will not print data sent to it by the user since the print inhibit switch has been left in the active position. If the print inhibit switch has not been activated, processor 10 will then interrogate the hammer bank interlock at 692. If this interlock is also activated, an appropriate fault flag will be set at 694 followed by a call up of the subroutine CUTOFF. Otherwise, the fault check subroutine is exited.

The CUTOFF subroutine is best shown in FIG. 17c. The CUTOFF subroutine simply resets the on-line signal at 696 to indicate that the system is going off-line, resets the READY signal at 698 to signify that the system is not in a condition to accept data from the user, stops the band at 700 and moves the contents of accumulator 162 to the visual display at 702 before exiting the subroutine. In this manner, the fault which has been set will be strobed to visual output device 66.

Status check, STACHK, is a similar diagnostic and error routine which will examine the status byte in regard to the number of system faults. For example, fault register 174 of timing and status module 16 will be interrogated to determine the status byte relating to the thirty-seven volt power supply during step 704. The twelve volt power supply will be checked at 706, the $-9$ V power supply at 708, the hammer driver voltage at 710, the hammer current at 712, the paper motor and clamp currents at 714, any band faults at 716, and the band transducer failure at 718. In each case, accumulator 162 is provided with a numerical indicator at steps 720–734 to communicate to the operator the specific fault which has been flagged. The CUTOFF subroutine is entered in each case at 736. The master clear disabled at 738 so that once a status error has been detected, the printer system cannot be cleared and attempted to be rerun, but will continue through the status check until it reaches the STOP position. The 37 V power supply is disabled at 740 followed by the disabling of the hammer and clamp voltages at 742. An endless loop stop mode will be entered at 746 and the printer will remain inoperative until the primary power is interrupted and restored by the power on switch. If the status check subroutine has been entered without the indication of any error, an appropriate flag will be set at 748 in accumulator 162 followed by entry to the CUTOFF subroutine at 750 and the enabling of master clear at 752 to reset the entire printer system before entering the stop loop at 746. It can readily be appreciated in light of the above discussion that the capability of the present system to provide a detailed diagnostic and analysis scheme is virtually unlimited, and such diagnostics may be extended to malfunctions occurring even within the program control itself as well as with peripheral and user errors as discussed above.

Figure 19B:
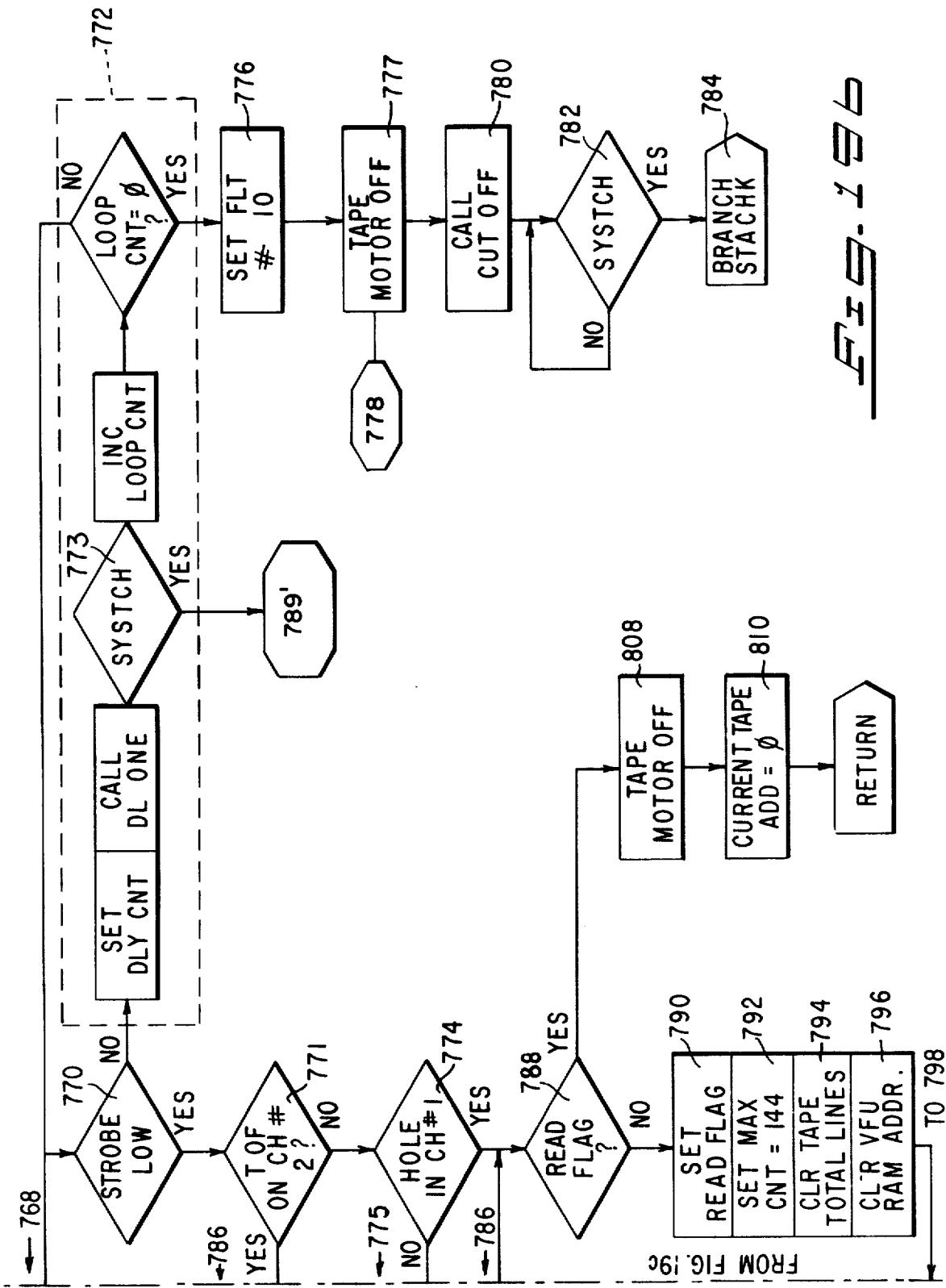
FIGS. 19*a*, *b* and *c* are flow diagrams of the tape read subroutine which can be selectively entered to read the instructions from a tape loop from a tape reader into the vertical format unit.
Figure 19C:
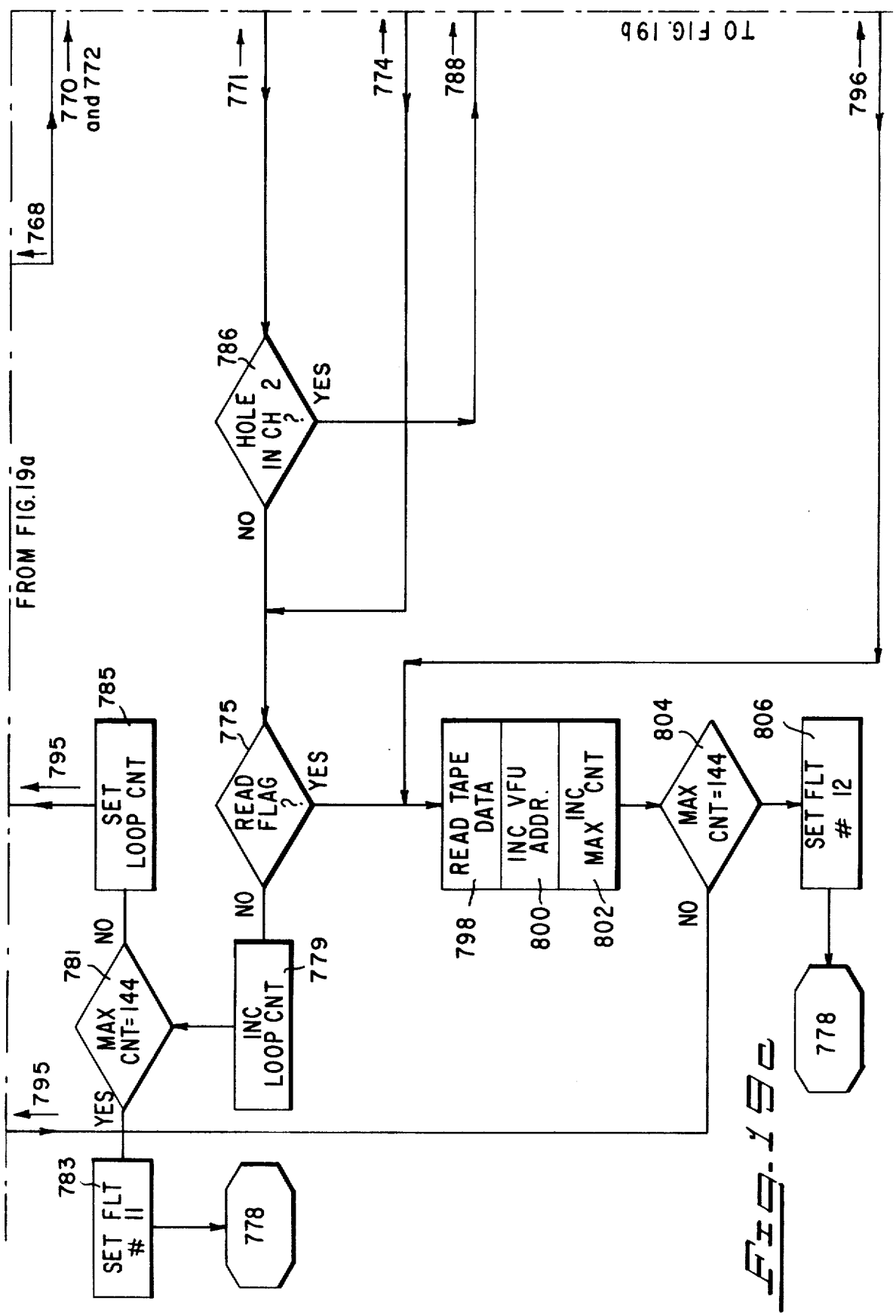

The tape read subroutine, TAPERED, is best shown in FIGS. 19a, b and c. Processor 10 will not enter the tape read subroutine until a tape request has been acknowledged at 754. Following receipt of a tape request, the tape motor is turned on at 756 after an appropriate delay at 758, the maximum tape length is set at 760. The loop count is set to a predetermined negative number and a read flag reset at 762. After the tape reader strobe goes low at 766, the loop count is again set at 768. If the strobe is not active, processor 10 will enter a momentary delay at 772 in FIG. 19B which may include an interrogation of the system check signal at 773. If after a predetermined time, a tape reader 70 has not presented a strobe, a fault is set at 776, the tape motor turned off at 777, subroutine CUTOFF entered at 780, followed by an interrogation at 782 of the system check signal to determine the reason why tape reader 70 did not strobe. When the system check signal goes low indicating an error, the subroutine, STACHK is entered at 784. However, during normal operation, the data strobe will go low and active at 770. Processor 10 will then interrogate at 771 whether the top of form information will be stored in the second channel, if not it will assume that it will be stored in the first channel and will commence to look in the first channel for a hole at 774. If no hole is found at that position in the loop, the read flag will be interrogated at 775 in FIG. 19c. Since no hole was yet found, the read flag will remain reset. The loop count will be incremented at 779 and compared against the maximum permissible loop count at 781. If the maximum loop count has been reached, an appropriate fault flag will be set at 783 to indicate to the operator that no hole was found in the top of form channel. A jump 778 then is taken to 777 where the tape motor is turned off. If the maximum count has not been reached at 781, the loop count will again be set at 785 and the data strobe from the tape reader interrogated at 795 in FIG. 19a. If the strobe is low, a momentary delay 787, identical to the delay 772 will be entered with the result that if a system check signal, SYSCHK, is found, the tape motor will be turned off at 789 and the program exited to status check subroutine, STACHK, at 791. If the active load strobe is not removed within a predetermined time, an appropriate error flag will be set at 793 and a jump is made via 778. The tape motor then is turned off at 777 followed by a call up of the subroutine CUTOFF at 780 and ultimately a call to the subroutine STACHK at 784.

However, if the strobe operates properly, the sequence of steps 768, 770, 771 and 774 or 786 will follow in sequence with the loop count incremented. Each of the 143 permissible words on the loop will be interrogated in turn for the presence of a hole. When a hole is found, either at step 774 in channel 1 or equivalently at step 786 in channel 2, the status of the read flag will be interrogated at 788. If the read flag, as is typically the case, has not previously been set, it will be set at 790 to indicate that the top of form has been found. The maximum count will be set at 792, a register which counted the total lines on the tape loop will be cleared together with the VFU address register at 796. The data on the tape will be read at 798 in FIG. 19c and the VFU address incremented at 800. The line count will similarly be incremented at 802 and compared against the maximum line count at 804. If the maximum line count has not been reached, processor 10 will return to step 795 to wait once again until the tape reader data strobe goes high. Data will be continually fed from the tape until the top of form hole is once again detected in channel 1 or 2 at steps 774 or 786. However, at this time, the read flag will be set at 788 resulting in processor 10 turning off the tape motor at 808 followed by a return or exit from the subroutine.

Although the present invention has been described in connection with a particular embodiment and operational scheme illustrated in the flow diagrams, it is to be expressly understood that the modifications and alternations which may be made by those having ordinary skill in the art are numerous and do not depart from the spirit and scope of the claimed invention. Thus, it is possible that many other modes of operation may be devised and that many other ways of doing the same modes may be effected. One of the particular advantages of the present invention is its flexibility and adaptability to operate not only in the manner as illustrated, but to be capable of operating in a large number of ways without departing from the basic teachings set forth above.

We claim:

1. A printer controller operable in a plurality of modes for interrogating and controlling a printer mechanism, comprising:

a plurality of buses;

interface means, coupled to at least one of said buses, for interfacing a data source to said at least one bus, said interface means including circuitry for receiving digital data and commands from that data source, said interface means also providing status and fault indicating signals indicative of operating conditions of said interface means;

timing and status means, coupled to at least one of said buses, for generating timing, status and fault indicating signals indicative of operating parameters of said printer mechanism;

printer mechanism actuating means, coupled to at least one of said buses, for receiving actuating signals from at least one of said buses and for actuating said printer mechanism in response thereto so as to produce formatted hardcopy printout, said printer mechanism actuating means also providing status and fault indicating signals indicative of operating conditions of said printer mechanism actuating means; and a programmable central processor, coupled to said buses, (a) for manipulating said digital data to generate said actuating signals for said printer mechanism actuating means, (b) for controlling said interface means, said timing and status means and said printer mechanism actuating means, and (c) for interrogating status and fault indicating signals in said interface means, said timing and status means, and said printer mechanism actuating means so as to provide in response thereto a plurality of condition indicating signals and diagnostic signals indicative of fault detection.

2. The printer controller of claim 1 further including:

a vertical format unit coupled to at least one of said buses and having format memory means for storing print format instructions, said central processor interrogating said vertical format unit so as to ascertain the print format instructions stored therein and controlling said printer mechanism actuating means in response to said ascertained instructions.

3. The printer controller of claim 2 wherein said interface means includes interconnections with a tape reader, and wherein said central processor includes means for causing new print format instructions to be entered into said vertical format unit via said interface means either from said tape reader or from said data source.

4. The printer controller of claim 2 wherein said central processor includes means for interrogating the status of said vertical format unit to determine the availability of said unit for data entry, and means, enabled upon determination of such availability, for entering new print format instructions to said vertical format unit via said interface means from an external data source.

5. The printer controller of claim 2 wherein said printer mechanism actuating means includes:

a power module having driver circuitry for generating a plurality of drive signals for said print mechanism to cause selected movement of paper, said central processor controlling said driver circuitry so as to cause movement of said paper in accordance with said interrogation of said print format instructions stored in said vertical format unit.

6. The printer controller of claim 5 wherein said central processor includes means responsive to the interrogation of said stored print format instructions for loading into a register the number of lines to be skipped by said printer mechanism before printing the next line of hardcopy output, said processor including means for causing said power module to generate appropriate drive signals to cause said printer mechanism to move said paper so as to skip a number of lines corresponding to that loaded in said register.

7. The printer controller of claim 5 wherein said central processor includes self-test means for controlling said printer mechanism actuating means so as to print a preselected set of data and to move said paper in a preselected pattern while interrogating said printer mechanism actuating means to ascertain the proper functioning thereof.

8. The printer controller of claim 1 wherein said interface means includes a plurality of control switches and status buffer means for generating status indicating signals in response to actuation of said control switches, and wherein said controlling of said printer mechanism actuating means by said central processor is modified in accordance with said generated status information.

9. The printer controller of claim 1 wherein said interface means includes means for transmitting, under control of said central processor, selected ones of said condition indicating signals and diagnostic signals to said data source.

10. The printer controller of claim 1 wherein said timing and status means includes:
fault monitors for monitoring fault conditions within said printer mechanism and for generating fault indicating signals in response thereto, and
transducer and character clock means for generating timing signals utilized by said central processor to synchronize control of said printer mechanism, said central processor including means for interrupting said printer mechanism operation in response to certain of said printer mechanism fault condition indicating signals.

11. The printer controller of claim 1 wherein said central processor includes a sequencer and a program memory containing an alterable set of instructions, said sequencer and said program memory cooperating to direct the operation of said processor, in a sequenced order established by said set of instructions, to preform said manipulating, said controlling, and said interrogating together with means for modifying said sequenced order of operation of said processor in response to certain of said interrogated status and falult indicating signals.

12. The printer controller of claim 11 wherein said central processor includes, each under direction of said sequencer and the set of instructions in said program memory, (a) means for directing said interface means in a load mode to transmit a "demand" command to said data source and to receive digital data or commands received in response thereto, (b) means for detecting whether a command has been received from said data source in an "illegal character detect" mode and for executing the command designated thereby, (c) means for editing received digital data prior to printing thereof in an edit mode, (d) means for controlling said printer mechanism actuating means so as to actuate said printer mechanism to print said edited data in a print mode, and (e) means for controlling said printer mechanism actuating means to establish the vertical format of printed data in a format mode.

13. A printer control for control of a digital printer comprising:
a register bus;
an out-bus;
an in-bus;
an address bus;
a plurality of discrete control lines;
an interface circuit, coupled to said register bus, in-bus, out-bus, address bus, and a first subset of said plurality of discrete control lines, for interfacing said printer control with an information source;
a central processor coupled to said register bus, out-bus, in-bus, address bus and a second subset of said plurality of discrete control lines, said central processor having means for selectively controlling movement of digital data in said printer control, for selectively manipulating said digital data and for selectively generating a plurality of instructions, coupled to said out-bus, address bus, and said second subset of discrete control lines, and for isolating, analyzing and responding to a plurality of status and fault conditions of said digital printer, digital data and printer control;
a timing and status circuit coupled to said in-bus, out-bus, address bus and a third subset of said plurality of discrete control lines, said timing and status circuit having means for interfacing said central processor to said digital printer;
a power circuit coupled to said address bus, said digital printer, and a fourth subset of said plurality of discrete control lines, said power circuit having means for selectively generating a plurality of circuit voltages and drive signals used by said digital printer to move a hard copy printout within said digital printer; and
a hammer driver circuit coupled to said out-bus and a fifth subset of said plurality of discrete control lines, said hammer driver circuit having means for selectively causing a selected imprint to be made on said hardcopy printout of said digital printer.

14. The printer control circuit of claim 13 wherein said information source is a selectable one of the group consisting of a digital user system, a tape reader mechanism, and a plurality of manually operated switches to control the transmission of data and to control printout format.

15. The printer control of claim 13 further including a vertical format circuit coupled to said central processor, said vertical format circuit storing, for selective retrieval, a plurality of format instructions to be used as input information by said central processor.

16. The printer control of claim 13 wherein said central processor includes:
a plurality of internal buses;
a control section comprised of a program sequencer, a program memory coupled to said program sequencer, an instruction register having inputs coupled to said program memory and outputs coupled to said program sequencer, and an address output register having inputs coupled to said program memory and outputs coupled to said address bus;
an arithmetic, logic and memory section coupled to said control section comprised of an arithmetic/logic unit, a line buffer address register having inputs coupled to the outputs of said arithmetic/logic unit, a line buffer memory having addressable inputs coupled to said line buffer address register and outputs coupled to said arithmetic/logic unit, a data output register having inputs coupled to said arithmetic/logic unit and outputs coupled to said out-bus, and a plurality of registers, accumulators and latches circuitwise connected to said arithmetic/logic unit; and an image memory section coupled to said arithmetic, logic and memory section comprised of a plurality of addressable image memories each having programmed contents corresponding to a unique font set employed by said digital printer, and means for accessing said programmed contents of said image memories.

17. The printer control of claim 13 wherein said central processor includes an arithmetic/logic unit employing a plurality of parallel input buses, whereby information on a plurality of buses may be operated upon by a single instruction.

18. A method for translating digital data into a hardcopy printout in a digital printer and controller comprising the steps of:

receiving digital data in an interface circuit from an information source, said interface circuit having means for decoding and storing said digital data in a plurality of latches;

selectively interrogating said plurality of laches in said interface circuit by a central processor unit under program control to obtain said digital data selectively interrogating a timing and status circuit associated with a printer mechanism to identify fault conditions of said printer mechanism and to obtain printer mechanism timing signals;

editing said obtained digital data within said central processor unit under program control and selectively generating a plurality of execution commands in said central processor unit utilizing said obtained timing signals and coupling said execution commands to said printer mechanism to print out said edited data as hardcopy printout in a programmably controlled manner.

19. A printer controller operable in a plurality of modes for interrogating and controlling a printer mechanism, comprising:

a plurality of buses;

interface means, coupled to at least one of said buses, for interfacing a data source to said at least one bus, said interface means including circuitry for receiving digital data and commands from that data source, said interface means also providing status and fault indicating signals indicative of operating conditions of said interface means;

timing and status means, coupled to at least one of said buses, for generating timing, status and fault indicating signals indicative of operating parameters of said printer mechanism;

printer mechanism actuating means, coupled to at least one of said buses, for receiving actuating signals from at least one of said buses and for actuating said printer mechanism in response thereto so as to produce formatted hardcopy printout, said printer mechanism actuating means also providing status and fault indicating signals indicative of operating conditions of said printer mechanism actuating means; and a programmable central processor, coupled to said buses, (a) for manipulating said digital data to generate said actuating signals for said printer mechanism actuating means, (b) for controlling said interface means, said timing and status means and said printer mechanism actuating means, and (c) for interrogating status and fault indicating signals in said interface means, said timing and status means, and said printer mechanism actuating means so as to provide in response thereto a plurality of condition indicating signals and diagonstic signals indicative of fault detection, said central processor including a sequencer and a program memory containing an alterable set of instructions, said sequencer and said program memory cooperating to direct the operation of said processor in a sequenced order established by said set of instructions, to perform said manipulating, said controlling, and said interrogating together with means for modifying said sequenced order of operation of said processor in response to certain of said interrogated status and fault indicating signals, said central processor further including, each under direction of said sequencer and the set of instructions in said program memory, (a) means for directing said interface means in a load mode to transmit a "demand" command to said data source and to receive digital data or commands received in response thereof, (b) means for detecting whether a command has been received from said data source in an "illegal character detect" mode and for executing the command designated thereby, (c) means for editing received digital data prior to printing thereof in an edit mode, (d) means for controlling said printer mechanism actuating means so as to actuate said printer mechanism to print said edited data in a print mode, and (e) means for controlling said printer mechanism actuating means to establish the vertical format of printed data in a format mode, said printer controller further including:

a vertical format unit coupled to at least one of said buses and having format memory means for storing print format instructions, said central processor interrogating said vertical format unit so as to ascertain the print format instructions stored therein and controlling said printer mechanism actuating means in response to said ascertained instructions, said central processor including means for interrogating the status of said vertical format unit to determine the availability of said unit for data entry, and means, enabled upon determination of such availability, for entering new print format instructions to said vertical format unit via said interface means from said data source.

* * * * *